(12) United States Patent
Otsuka et al.

(10) Patent No.: US 9,522,995 B2
(45) Date of Patent: Dec. 20, 2016

(54) PROTECTIVE FILM AND COMPOSITION FOR PREPARING THE SAME, SLURRY, AND ELECTRICAL STORAGE DEVICE

(71) Applicant: JSR CORPORATION, Minato-ku (JP)

(72) Inventors: Yoshiharu Otsuka, Minato-ku (JP); Hironori Kitaguchi, Minato-ku (JP); Nobuyuki Fujihara, Minato-ku (JP)

(73) Assignee: JSR Corporation, Minato-ku (JP)

( * ) Notice: Subject to any disclaimer, the term of this patent is extended or adjusted under 35 U.S.C. 154(b) by 44 days.

(21) Appl. No.: 14/352,549

(22) PCT Filed: Oct. 4, 2012

(86) PCT No.: PCT/JP2012/075775
§ 371 (c)(1),
(2) Date: Apr. 17, 2014

(87) PCT Pub. No.: WO2013/058119
PCT Pub. Date: Apr. 25, 2013

(65) Prior Publication Data
US 2014/0272523 A1    Sep. 18, 2014

(30) Foreign Application Priority Data
Oct. 18, 2011   (JP) ................ 2011-228753

(51) Int. Cl.
*H01M 2/16* (2006.01)
*H01M 10/052* (2010.01)
(Continued)

(52) U.S. Cl.
CPC ................ *C08L 27/16* (2013.01); *C08K 3/22* (2013.01); *C08L 33/08* (2013.01); *C08L 33/12* (2013.01);
(Continued)

(58) Field of Classification Search
CPC .... H01M 2/1653; H01M 2/1673; H01M 4/04; H01M 10/052; H01G 9/07; H01G 9/145; H01G 11/00; H01G 11/52
See application file for complete search history.

(56) References Cited

U.S. PATENT DOCUMENTS 5,349,003 A * 9/1994 Kato et al. ............ 524/458
5,900,183 A * 5/1999 Kronfli et al. ........ 252/62.2
(Continued)

FOREIGN PATENT DOCUMENTS

CN   1447996 A   10/2003
CN   1495937 A    5/2004
(Continued)

OTHER PUBLICATIONS

J-PlatPat Machine Translation of the detailed description of JP 2009-054455A (Mar. 2009).*
(Continued)

*Primary Examiner* — Gregg Cantelmo
(74) *Attorney, Agent, or Firm* — Oblon, McClelland, Maier & Neustadt, L.L.P.

(57) ABSTRACT

An electrical storage device includes a cathode, an anode, a protective film that is provided between the cathode and the anode, and an electrolyte solution, the protective film including a polymer that includes a repeating unit derived from a fluorine-containing monomer, and a repeating unit derived from an unsaturated carboxylic acid.

10 Claims, 3 Drawing Sheets

(51) Int. Cl.
  H01M 4/04    (2006.01)
  H01G 11/52   (2013.01)
  H01G 9/07    (2006.01)
  H01G 9/14    (2006.01)
  H01G 11/00   (2013.01)
  C08L 27/16   (2006.01)
  C08K 3/22    (2006.01)
  C08L 33/08   (2006.01)
  C08L 33/12   (2006.01)
  H01G 9/145   (2006.01)

(52) U.S. Cl.
  CPC .............. *H01G 9/07* (2013.01); *H01G 9/145* (2013.01); *H01G 11/00* (2013.01); *H01G 11/52* (2013.01); *H01M 2/1653* (2013.01); *H01M 2/1673* (2013.01); *H01M 4/04* (2013.01); *H01M 10/052* (2013.01); *C08K 2003/2241* (2013.01); *Y02E 60/122* (2013.01); *Y02E 60/13* (2013.01)

(56) References Cited

U.S. PATENT DOCUMENTS

| | | | |
|---|---|---|---|
| 6,815,124 B2 * | 11/2004 | Suzuki | H01M 6/181 429/231.1 |
| 8,512,898 B2 | 8/2013 | Baba et al. | |
| 8,663,839 B2 | 3/2014 | Maegawa et al. | |
| 2003/0170545 A1 | 9/2003 | Coowar et al. | |
| 2004/0029014 A1 | 2/2004 | Hwang et al. | |
| 2009/0061313 A1 | 3/2009 | Tadano | |
| 2010/0133482 A1 * | 6/2010 | Abusleme et al. | 252/511 |
| 2010/0255380 A1 | 10/2010 | Baba et al. | |
| 2012/0268072 A1 * | 10/2012 | Okuno | H01M 2/1653 320/128 |
| 2012/0309892 A1 * | 12/2012 | Ootsuka et al. | 524/546 |
| 2013/0052530 A1 | 2/2013 | Kitaguchi et al. | |
| 2013/0323588 A1 | 12/2013 | Kajiwara et al. | |
| 2014/0030592 A1 | 1/2014 | Maegawa et al. | |
| 2014/0038041 A1 | 2/2014 | Kajiwara et al. | |

FOREIGN PATENT DOCUMENTS

| | | |
|---|---|---|
| CN | 101550322 A | 10/2009 |
| CN | 101714656 | 5/2010 |
| JP | 2004-071566 | 3/2004 |
| JP | 2004-281208 | 10/2004 |
| JP | 2007-154029 | 6/2007 |
| JP | 2009-054455 | 3/2009 |
| JP | 2009-087562 | 4/2009 |
| JP | 2009-246137 | 10/2009 |
| JP | 2009-267382 | 11/2009 |
| JP | 2010146870 A * | 7/2010 |
| TW | I237643 | 8/2005 |
| WO | 2009/041395 | 4/2009 |

OTHER PUBLICATIONS

U.S. Appl. No. 14/679,431, filed Apr. 6, 2015, Kitaguchi, et al.
U.S. Appl. No. 13/983,428, filed Oct. 9, 2013, Yamada, et al.
International Search Report issued Dec. 25, 2012, in PCT/JP12/075775, filed Oct. 4, 2012.
U.S. Appl. No. 14/427,233, filed Mar. 10, 2015, Katsuda, et al.
Combined Chinese Office Action and Search Report issued Nov. 3, 2015 in Patent Application No. 201280051427.3 (with English language translation).
Office Action issued Jun. 12, 2016 in Chinese Patent Application No. 201280051427.3 (with English translation).

* cited by examiner

PROTECTIVE FILM AND COMPOSITION FOR PREPARING THE SAME, SLURRY, AND ELECTRICAL STORAGE DEVICE

CROSS REFERENCE TO RELATED APPLICATIONS

The present application is a 35 U.S.C. §371 national stage patent application of International patent application PCT/JP2012/075775, filed on Oct. 4, 2012, published as WO/2013/058119 on Apr. 25, 2013, the text of which is incorporated by reference, and claims the benefit of the filing date of Japanese application no. 2011-228753, filed on Oct. 18, 2011, the text of which is also incorporated by reference.

TECHNICAL FIELD

The present invention relates to a protective film that may be used for an electrical storage device, a composition for forming the protective film, a slurry, and an electrical storage device that includes the protective film.

BACKGROUND ART

In recent years, a high-voltage electrical storage device having high energy density has been desired as a power supply for driving an electronic device. In particular, a lithium-ion battery and a lithium-ion capacitor are expected to be a high-voltage electrical storage device having high energy density.

A reduction in size has been desired for such a high-voltage electrical storage device having high energy density. In order to reduce the size of the electrical storage device, it is necessary to reduce the thickness of the separator that isolates the cathode and the anode in addition to the thickness of the cathode, the anode, and the like, for example. However, a short circuit may easily occur when the interval between the cathode and the anode decreases along with a reduction in size of the electrical storage device.

In particular, when the electrical storage device utilizes metal ions such as lithium ions, a dendrite tends to be produced on the surface of the electrode due to the metal ions during repeated charge and discharge. Such a dendrite normally precipitates in the form of a needle-like crystal, and is easily grown through the separator (i.e., porous film (membrane)). If a dendrite has been grown through the separator, and has reached the surface of the other electrode, the electrical storage device is short-circuited, and the charge/discharge function is lost.

It is likely that the above phenomenon occurs (i.e., reliability deteriorates) along with a reduction in thickness of the separator and a reduction in the interval between the cathode and the anode. WO2009/041395 and JP-A-2009-87562 disclose a technique that improves the battery characteristics by forming a porous layer that includes a resin binder including a polyamide, polyimide, or polyamideimide on the porous separator substrate in order to prevent the above phenomenon. JP-A-2009-54455 discloses a technique that improves the battery characteristics by forming a porous protective film that includes a binder including a fluorine-based resin and a rubber-based resin on at least one of the surface of the cathode and the surface of the anode.

SUMMARY OF INVENTION

Technical Problem

According to the above patent documents, a short circuit due to a dendrite produced along with charge and discharge can be suppressed by forming the protective film on the separator or the surface of the electrode. However, since a deterioration in electrolyte solution permeability/retention capability occurs, adsorption/desorption of lithium ions with respect to the active material is hindered. As a result, the internal resistance of the electrical storage device increases, and the charge-discharge characteristics deteriorate.

Specifically, a protective film-forming material that exhibits excellent electrolyte solution permeability/retention capability, and can suppress an increase in internal resistance of the electrical storage device has not been known. In particular, when applying a binder that includes an organic polymer to the protective film that is situated opposite to the cathode, it is necessary to ensure high oxidation resistance that can endure oxidation due to a cathode reaction.

Several aspects of the invention may solve the above problems, and may provide a protective film that exhibits excellent electrolyte solution permeability/retention capability, and can suppress an increase in internal resistance of an electrical storage device, a composition and a slurry for forming the protective film, and an electrical storage device that includes the protective film.

Solution to Problem

The invention was conceived in order to solve at least some of the above problems, and may be implemented by the following aspects or application examples.

APPLICATION EXAMPLE 1

According to one aspect of the invention, an electrical storage device includes a cathode, an anode, a protective film that is provided between the cathode and the anode, and an electrolyte solution, the protective film including a polymer that includes a repeating unit derived from a fluorine-containing monomer, and a repeating unit derived from an unsaturated carboxylic acid.

APPLICATION EXAMPLE 2

In the electrical storage device according to Application Example 1, the protective film may come in contact with at least one of the surface of the cathode and the surface of the anode.

APPLICATION EXAMPLE 3

The electrical storage device according to Application Example 1 may further include a separator that is provided between the cathode and the anode.

APPLICATION EXAMPLE 4

In the electrical storage device according to Application Example 3, the surface of the separator may be covered with the protective film.

APPLICATION EXAMPLE 5

In the electrical storage device according to Application Example 3, the protective film may be held between the cathode or the anode, and the separator in a contact state.

APPLICATION EXAMPLE 6

According to another aspect of the invention, a composition for forming the protective film according to any one of Application Examples 1 to 5 includes:

polymer particles that include a repeating unit derived from a fluorine-containing monomer, and a repeating unit derived from an unsaturated carboxylic acid, the polymer particles having a number average particle size (Da) of 20 to 450 nm; and a liquid medium.

APPLICATION EXAMPLE 7

In the composition according to Application Example 6, the polymer particles may include 5 to 50 parts by mass of the repeating unit derived from a fluorine-containing monomer, and 1 to 10 parts by mass of the repeating unit derived from an unsaturated carboxylic acid, based on 100 parts by mass of the polymer particles.

APPLICATION EXAMPLE 8

In the composition according to Application Example 6 or 7, the polymer particles may be polymer alloy particles that include a polymer A that includes a repeating unit derived from at least one compound selected from a group consisting of vinylidene fluoride, tetrafluoroethylene, and hexafluoropropylene, and a polymer B that includes a repeating unit derived from an unsaturated carboxylic acid.

APPLICATION EXAMPLE 9

In the electrical storage device according to Application Example 8, the polymer alloy particles may have only one endothermic peak within a temperature range of −50 to +250° C. when subjected to differential scanning calorimetry (DSC) in accordance with JIS K 7121.

APPLICATION EXAMPLE 10

In the electrical storage device according to Application Example 9, the polymer alloy particles may have the only one endothermic peak within a temperature range of −30 to +30° C.

APPLICATION EXAMPLE 11

According to another aspect of the invention, a slurry includes the composition according to any one of Application Examples 6 to 10, and inorganic particles.

APPLICATION EXAMPLE 12

In the slurry according to Application Example 11, the inorganic particles may have a number average particle size of 0.1 to 0.8 micrometers.

APPLICATION EXAMPLE 13

The slurry according to Application Example 11 or 12 may include 0.1 to 15 parts by mass of polymer particles that include the repeating unit derived from a fluorine-containing monomer and the repeating unit derived from an unsaturated carboxylic acid based on 100 parts by mass of the inorganic particles.

APPLICATION EXAMPLE 14

In the slurry according to any one of Application Examples 11 to 13, the inorganic particles may be at least one type of particles selected from a group consisting of silica particles, titanium oxide particles, aluminum oxide particles, zirconium oxide particles, and magnesium oxide particles.

APPLICATION EXAMPLE 15

According to a further aspect of the invention, a protective film is formed using the slurry according to any one of Application Examples 11 to 14.

Advantageous Effects of Invention

An electrical storage device that includes a protective film formed using the protective film-forming composition according to one aspect of the invention exhibits excellent electrolyte solution permeability/retention capability, and can suppress an increase in internal resistance. Specifically, since the internal resistance of the electrical storage device increases to only a small extent even when subjected to repeated charge and discharge, or overcharge, the electrical storage device exhibits excellent charge-discharge characteristics. Since the protective film is provided between the cathode and the anode, it is possible to suppress occurrence of a short circuit that that may occur due to a dendrite produced during charge and discharge.

Since the protective film-forming composition according to one aspect of the invention exhibits excellent oxidation resistance, the protective film-forming composition may suitably be used to form a protective film that is situated opposite to the cathode of an electrical storage device.

DESCRIPTION OF EMBODIMENTS

Exemplary embodiments of the invention are described below in detail with reference to the drawings. Note that the invention is not limited to the following exemplary embodiments. It should be understood that the invention includes various modifications that may be made of the following exemplary embodiments without departing from the scope of the invention.

1. Electrical Storage Device

An electrical storage device according to one embodiment of the invention includes a cathode, an anode, a protective film that is provided between the cathode and the anode, and an electrolyte solution, the protective film including a polymer that includes a repeating unit derived from a fluorine-containing monomer, and a repeating unit derived from an unsaturated carboxylic acid. First to third embodiments are described below with reference to the drawings.

1.1. First Embodiment

Figure 1:
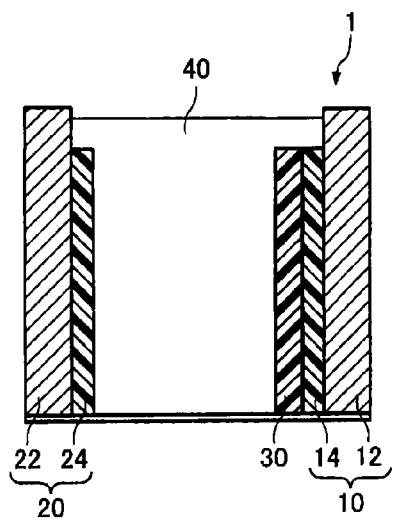
FIG. 1 is a schematic view illustrating the cross section of an electrical storage device according to a first embodiment.

FIG. 1 is a schematic view illustrating the cross section of an electrical storage device according to the first embodiment. As illustrated in FIG. 1, an electrical storage device 1 includes a cathode 10 that is formed by forming a cathode active material layer 14 on the surface of a cathode current collector 12, an anode 20 that is formed by forming an anode active material layer 24 on the surface of an anode current collector 22, a protective film 30 that is provided between the cathode 10 and the anode 20, and an electrolyte solution 40 with which the space between the cathode 10 and the anode 20 is filled. In the electrical storage device 1, a separator is not provided between the cathode 10 and the anode 20. A situation in which the cathode 10 and the anode 20 come in contact with each other, and are short-circuited does not occur as long as the cathode 10 and the anode 20 are sufficiently secured by a solid electrolyte or the like.

Although the cathode 10 illustrated in FIG. 1 has a configuration in which the cathode active material layer 14 is not formed on one side of the cathode current collector 12 that extends in the longitudinal direction so that the cathode current collector 12 is exposed, the cathode active material layer 14 may be formed on each side of the cathode current collector 12. Although the anode 20 illustrated in FIG. 1 has a configuration in which the anode active material layer 24 is not formed on one side of the anode current collector 22 that extends in the longitudinal direction so that the anode current collector 22 is exposed, the anode active material layer 24 may be formed on each side of the anode current collector 22.

A metal foil, an etched metal foil, an expanded metal, or the like may be used as the cathode current collector 12. Specific examples of a material for forming the cathode current collector 12 include a metal such as aluminum, copper, nickel, tantalum, stainless steel, and titanium. An appropriate material may be selected depending on the type of the desired electrical storage device. For example, when producing a cathode of a lithium-ion secondary battery, it is preferable to use aluminum as the material for forming the cathode current collector 12. In this case, the thickness of the cathode current collector 12 is preferably 5 to 30 micrometers, and more preferably 8 to 25 micrometers.

The cathode active material layer 14 includes one cathode material or two or more cathode materials that can be doped/undoped with lithium as the cathode active material. The cathode active material layer 14 optionally includes a conductivity-imparting agent such as graphite. The cathode active material layer 14 may include a binder such as a fluorine-containing polymer (e.g., polyvinylidene fluoride or polyacrylic fluoride), a thickener used to disperse the cathode active material, or a polymer composition that includes a styrene-butadiene rubber (SBR) or a (meth)acrylate copolymer.

The cathode active material is not particularly limited as long as the cathode active material is a cathode material that can be doped/undoped with lithium, and includes a sufficient amount of lithium. It is preferable to use a complex metal oxide of lithium and a transition metal represented by $LiMO_2$ (wherein M includes at least one element among Co, Ni, Mn, Fe, Al, V, and Ti), an intercalation compound that includes lithium, or the like. It is also possible to use a compound represented by $Li_aMX_b$ (wherein M is an element selected from a transition metal, X is selected from S, Se, and $PO_4$, a is larger than 0, and b is an integer). It is particularly preferable to use a lithium complex oxide represented by $Li_xM_{I}O_2$ or $Li_yM_{II2}O_4$ as the cathode active material since a high voltage can be generated, and the energy density can be increased. Note that $M_I$ is one or more transition metal elements, and preferably at least one transition metal element selected from cobalt (Co) and nickel (Ni). $M_{II}$ is one or more transition metal elements, and preferably manganese (Mn). x and y differ depending on the battery charge/discharge state. x and y are normally within the range of 0.05 to 1.10. Specific examples of the lithium complex oxide include $LiCoO_2$, $LiNiO_2$, $LiNi_zCo_{1-z}O_2$ (wherein 0<z<1), $LiMn_2O_4$, and the like.

A metal foil, an etched metal foil, an expanded metal, or the like may be used as the anode current collector 22. Specific examples of a material for forming the anode current collector 22 include a metal such as aluminum, copper, nickel, tantalum, stainless steel, and titanium. An appropriate material may be selected depending on the type of the desired electrical storage device. It is preferable to use copper as the material for forming the anode current collector 22. In this case, the thickness of the anode current collector 22 is preferably 5 to 30 micrometers, and more preferably 8 to 25 micrometers.

The anode active material layer 24 includes one anode material or two or more anode materials that can be doped/undoped with lithium as the anode active material. The anode active material layer 24 optionally includes a binder similar to that used for the cathode.

A carbon material, a crystalline or non-crystalline metal oxide, or the like may preferably be used as the anode active material. Examples of the carbon material include non-graphitizable carbon materials such as coke and glassy carbon, graphite such as a highly crystalline carbon material having a highly developed crystalline structure, and the like. Specific examples of the carbon material include pyrolytic carbon, coke (e.g., pitch coke, needle coke, and petroleum coke), graphite, glassy carbon, a polymer compound calcined product (i.e., a product obtained by calcining and carbonizing a phenol resin, a furan resin, or the like at an appropriate temperature), carbon fibers, activated carbon, and the like. Examples of the crystalline or non-crystalline metal oxide include a crystalline or non-crystalline metal oxide that includes magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), or platinum (Pt). It is particularly preferable to use a crystalline or non-crystalline metal oxide that includes silicon (Si) or tin (Sn).

It is preferable to press the active material layer. Examples of a pressing means include a roll press, a high-pressure super press, a soft calender, a 1-ton press, and the like. The pressing conditions are appropriately set depending on the type of press, and the desired thickness and density of the active material layer. When producing a cathode of a lithium-ion secondary battery, it is preferable that the active material layer have a thickness of 40 to 100 micrometers and a density of 2.0 to 5.0 $g/cm^3$. When producing an anode of a lithium-ion secondary battery, it is preferable that the active material layer have a thickness of 40 to 100 micrometers and a density of 1.3 to 1.9 $g/cm^3$.

The protective film 30 is provided between the cathode 10 and the anode 20. In the electrical storage device 1 illustrated in FIG. 1, the protective film 30 is provided between the cathode 10 and the anode 20 so as to come in contact with the cathode active material layer 14. Note that the protective film 30 may be provided between the cathode 10 and the anode 20 so as to come in contact with the anode active material layer 24. The protective film 30 may be provided between the cathode 10 and the anode 20 so as not to come in contact with the cathode 10 and the anode 20. A short circuit does not occur due to the presence of the protective film 30 even if a dendrite is precipitated during repeated charge and discharge. This makes it possible to maintain the functions of the electrical storage device.

The protective film 30 includes a polymer that includes a repeating unit derived from a fluorine-containing monomer, and a repeating unit derived from an unsaturated carboxylic acid. A composition and a slurry for forming the protective film 30 are described in detail later.

The protective film 30 may be formed by applying a protective film-forming slurry described later to the surface of the cathode 10 (or the anode 20) to form a film, and drying the film. The protective film-forming slurry may be applied to the surface of the cathode 10 (or the anode 20) using a doctor blade method, a reverse roll method, a comma bar method, a gravure method, an air knife method, a die coating method, or the like. The film is preferably dried at 20 to 250° C. (more preferably 50 to 150° C.) for 1 to 120 minutes (more preferably 5 to 60 minutes).

The thickness of the protective film 30 is not particularly limited, but is preferably 0.5 to 4 micrometers, and more preferably 0.5 to 3 micrometers. When the thickness of the protective film 30 is within the above range, it is possible to achieve excellent electrolyte solution permeability/retention capability, and suppress an increase in internal resistance.

The electrolyte solution 40 is appropriately selected depending on the type of the desired electrical storage device. A solution prepared by dissolving an appropriate electrolyte in a solvent is used as the electrolyte solution 40.

When producing a lithium-ion secondary battery, a lithium compound is used as the electrolyte. Specific examples of the lithium compound include $LiClO_4$, $LiBF_4$, LiI, $LiPF_6$, $LiCF_3SO_3$, $LiAsF_6$, $LiSbF_6$, $LiAlCl_4$, LiCl, LiBr, $LiB(C_2H_5)_4$, $LiCH_3SO_3$, $LiC_4F_9SO_3$, $Li(CF_3SO_2)_2N$, and the like. In this case, the concentration of the electrolyte is preferably 0.5 to 3.0 mol/L, and more preferably 0.7 to 2.0 mol/L.

The type and the concentration of electrolyte when producing a lithium-ion capacitor are the same as those when producing a lithium-ion secondary battery.

Examples of the solvent used to prepare the electrolyte solution include carbonates such as propylene carbonate, ethylene carbonate, butylene carbonate, dimethyl carbonate, diethyl carbonate, and methylethyl carbonate; lactones such as gamma-butyrolactone; ethers such as trimethoxysilane, 1,2-dimethoxyethane, diethyl ether, 2-ethoxyethane, tetrahydrofuran, and 2-methyltetrahydrofuran; sulfoxides such as dimethyl sulfoxide; oxolane derivatives such as 1,3-dioxolane and 4-methyl-1,3-dioxolane; nitrogen-containing compounds such as acetonitrile and nitromethane; esters such as methyl formate, methyl acetate, butyl acetate, methyl propionate, ethyl propionate, and phosphoric acid triester; glyme compounds such as diglyme, triglyme, and tetraglyme; ketones such as acetone, diethyl ketone, methyl ethyl ketone, and methyl isobutyl ketone; sulfone compounds such as sulfolane; oxazolidinone derivatives such as 2-methyl-2-oxazolidinone; sultone compounds such as 1,3-propanesultone, 1,4-butanesultone, 2,4-butanesultone, and 1,8-naphthasultone; and the like.

1.2. Second Embodiment

Figure 2:
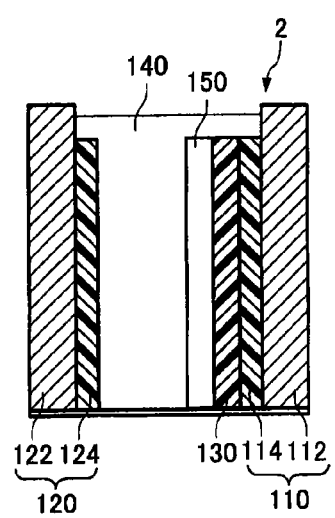
FIG. 2 is a schematic view illustrating the cross section of an electrical storage device according to a second embodiment.

FIG. 2 is a schematic view illustrating the cross section of an electrical storage device according to the second embodiment. As illustrated in FIG. 2, an electrical storage device 2 includes a cathode 110 that is formed by forming a cathode active material layer 114 on the surface of a cathode current collector 112, an anode 120 that is formed by forming an anode active material layer 124 on the surface of an anode current collector 122, a protective film 130 that is provided between the cathode 110 and the anode 120, an electrolyte solution 140 with which the space between the cathode 110 and the anode 120 is filled, and a separator 150 that is provided between the cathode 110 and the anode 120.

The electrical storage device 2 differs from the electrical storage device 1 in that the protective film 130 is provided so as to be held between the cathode 110 and the separator 150. Although the electrical storage device 2 illustrated in FIG. 2 has a configuration in which the protective film 130 is provided so as to be held between the cathode 110 and the separator 150, the protective film 130 may be provided so as to be held between the anode 120 and the separator 150. According to the above configuration, a short circuit does not occur due to the presence of the protective film 130 even if a dendrite is precipitated during repeated charge and discharge. This makes it possible to maintain the functions of the electrical storage device.

The protective film 130 may be formed by applying a protective film-forming slurry described later to the surface of the separator 150 to form a film, attaching the separator 150 to the cathode 110 (or the anode 120), and drying the film. The protective film-forming slurry may be applied to the surface of the separator 150 using a doctor blade method, a reverse roll method, a comma bar method, a gravure method, an air knife method, a die coating method, or the like. The film is preferably dried at 20 to 250° C. (more preferably 50 to 150° C.) for 1 to 120 minutes (more preferably 5 to 60 minutes).

The separator 150 is not particularly limited as long as the separator 150 is electrically stable, is chemically stable to the cathode active material, the anode active material, and/or the solvent, and does not have electrical conductivity. For example, a polymer nonwoven fabric, a porous film, or a sheet formed using glass or ceramic fibers may be used as the separator 150. A laminate of these materials may also be used as the separator 150. It is particularly preferable to use a porous polyolefin film as the separator 150. A composite of a porous polyolefin film and a heat-resistant material formed of polyimide, glass, or ceramic fibers may also be used as the separator 150.

The electrical storage device 2 according to the second embodiment is configured in the same manner as the electrical storage device 1 according to the first embodiment (see FIG. 1), except for the above features. Therefore, further description thereof is omitted.

1.3. Third Embodiment

Figure 3:
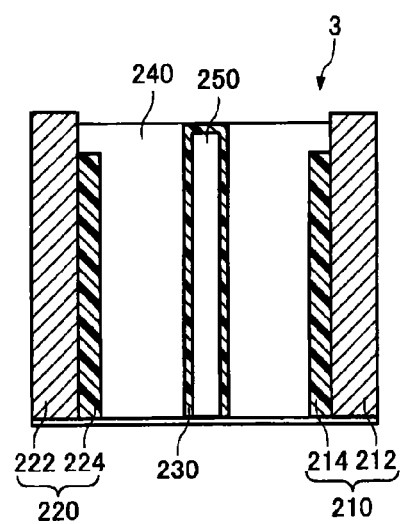
FIG. 3 is a schematic view illustrating the cross section of an electrical storage device according to a third embodiment.

FIG. 3 is a schematic view illustrating the cross section of an electrical storage device according to the third embodiment. As illustrated in FIG. 3, an electrical storage device 3 includes a cathode 210 that is formed by forming a cathode active material layer 214 on the surface of a cathode current collector 212, an anode 220 that is formed by forming an anode active material layer 224 on the surface of an anode current collector 222, an electrolyte solution 240 with which the space between the cathode 210 and the anode 220 is filled, a separator 250 that is provided between the cathode 210 and the anode 220, and a protective film 230 that is provided to cover the surface of the separator 250.

The electrical storage device 3 differs from the electrical storage device 1 and the electrical storage device 2 in that the protective film 230 is provided to cover the surface of the separator 250. According to the above configuration, a short circuit does not occur due to the presence of the protective film 230 even if a dendrite is precipitated during repeated charge and discharge. This makes it possible to maintain the functions of the electrical storage device.

The protective film 230 may be formed by applying a protective film-forming slurry described later to the surface of the separator 250 to form a film, and drying the film. The protective film-forming slurry may be applied to the surface of the separator 250 using a doctor blade method, a reverse roll method, a comma bar method, a gravure method, an air knife method, a die coating method, or the like. The film is preferably dried at 20 to 250° C. (more preferably 50 to 150° C.) for 1 to 120 minutes (more preferably 5 to 60 minutes).

The electrical storage device 3 according to the third embodiment is configured in the same manner as the electrical storage device 1 according to the first embodiment (see FIG. 1) and the electrical storage device 2 according to the second embodiment (see FIG. 2), except for the above features. Therefore, further description thereof is omitted.

1.4. Production Method

The above electrical storage device may be produced by placing two electrodes (cathode and anode, or two capacitor electrodes) opposite to each other optionally with a separator interposed therebetween to form a laminate, rolling or folding the laminate in the shape of a battery, placing the laminate in a battery casing, injecting an electrolyte solution into the battery casing, and sealing the battery casing, for example. The battery may have an arbitrary shape (e.g., coin, button, sheet, cylinder, square, or flat shape).

1.5. Applications

The above electrical storage device may suitably be used as a secondary battery or a capacitor mounted on an automobile (e.g., electric vehicle, hybrid car, or truck), and may also suitably be used as a secondary battery or a capacitor used for AV equipment, OA equipment, communication equipment, and the like.

2. Protective Film-Forming Composition

A protective film-forming composition according to one embodiment of the invention is used to form a protective film that is provided between a cathode and an anode of an electrical storage device, and includes polymer particles that include a repeating unit derived from a fluorine-containing monomer, and a repeating unit derived from an unsaturated carboxylic acid, the polymer particles having a number average particle size (Da) of 20 to 450 nm, and a liquid medium.

In recent years, an increase in lifetime of an electrical storage device (power supply) has been desired along with an increase in lifetime of an electronic device, and an improvement in charge-discharge characteristics has been strongly desired. Specifically, the following two characteristics have been desired. The electrical storage device has been desired to suppress an increase in internal resistance even when repeatedly charged and discharged a number of times. The electrical storage device has also been desired to suppress an increase in internal resistance even when overcharged. The resistance increase ratio is an index that indicates these characteristics. Specifically, an electrical storage device having a small resistance increase ratio exhibits excellent repeated charge-discharge resistance and overcharge resistance, and exhibits excellent charge-discharge characteristics.

A fluorine-containing organic polymer, a polyamide, a polyimide, and a polyamideimide have been widely used for an electrical storage device due to excellent oxidation resistance, but cannot meet recent severe requirements relating to the resistance increase ratio. The inventors of the invention conducted extensive studies in view of the above situation, and found that a protective film formed using a protective film-forming composition that includes polymer particles that include the above specific repeating units and have an average particle size (Da) within the above specific range does not increase the internal resistance of the electrical storage device, and can reduce the resistance increase ratio. This finding has led to the completion of the invention. Since the protective film-forming composition according to one embodiment of the invention can reliably retain the inorganic particles described later, the resulting protective film exhibits improved lithium ion permeability and improved toughness.

Each component included in the protective film-forming composition is described in detail below. Note that the term "(meth)acrylic acid" used herein refers to "acrylic acid" or "methacrylic acid". The above definition also applies to the term "(meth)acrylonitrile" and a similar term.

2.1. Polymer Particles

The protective film-forming composition according to one embodiment of the invention includes polymer particles that include a repeating unit derived from a fluorine-containing monomer, and a repeating unit derived from an unsaturated carboxylic acid (hereinafter may be referred to as "polymer particles").

2.1.1. Fluorine-containing Monomer

Examples of the fluorine-containing monomer include fluorine-containing olefin compounds, fluorine-containing (meth)acrylate compounds, and the like. Examples of the fluorine-containing olefin compounds include vinylidene fluoride, tetrafluoroethylene, hexafluoropropylene, ethylene chloride trifluoride, perfluoroalkyl vinyl ethers, and the like. Examples of the fluorine-containing (meth)acrylates include a compound represented by the following general formula (1), [4[1-trifluoromethyl-2,2-bis[bis(trifluoromethyl)fluoromethyl]ethynyloxy]benzoxy]2-hydroxypropyl (meth)acrylate, and the like.

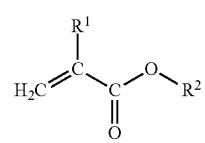

(1)

wherein $R^1$ is a hydrogen atom or a methyl group, and $R^2$ is a fluorine-containing hydrocarbon group having 1 to 18 carbon atoms.

Examples of the fluorine-containing hydrocarbon group having 1 to 18 carbon atoms represented by $R^2$ in the general formula (1) include fluoroalkyl groups having 1 to 12 carbon atoms, fluoroaryl groups having 6 to 16 carbon atoms, fluoroaralkyl groups having 7 to 18 carbon atoms, and the like. It is preferable that $R^2$ be a fluoroalkyl group having 1 to 12 carbon atoms. Specific examples of a preferable fluorine-containing hydrocarbon group having 1 to 18 carbon atoms represented by $R^2$ in the general formula (1) include a 2,2,2-trifluoroethyl group, a 2,2,3,3,3-pentafluoropropyl group, a 1,1,1,3,3,3-hexafluoropropan-2-yl group, a beta-(perfluorooctyl)ethyl group, a 2,2,3,3-tetrafluoropropyl group, a 2,2,3,4,4,4-hexafluorobutyl group, a 1h,1h,5h-octafluoropentyl group, a 1h,1h,9h-perfluoro-1-nonyl group, a 1h,1h,11h-perfluoroundecyl group, a perfluorooctyl group, and the like. The fluorine-containing monomer is preferably a fluorine-containing olefin compound, and more preferably at least one compound selected from the group consisting of vinylidene fluoride, tetrafluoroethylene, and hexafluoropropylene. These fluorine-containing monomers may be used either alone or in combination.

It is preferable that the polymer particles include the repeating unit derived from the fluorine-containing monomer in an amount of 5 to 50 parts by mass, more preferably 15 to 40 parts by mass, and particularly preferably 20 to 30 parts by mass, based on 100 parts by mass of the polymer particles.

2.1.2. Unsaturated Carboxylic Acid

Examples of the unsaturated carboxylic acid include monocarboxylic acids and dicarboxylic acids such as acrylic acid, methacrylic acid, crotonic acid, maleic acid, fumaric acid, and itaconic acid. The unsaturated carboxylic acid may be one or more compounds selected from these compounds. It is preferable to use one or more compounds selected from acrylic acid and methacrylic acid as the unsaturated carboxylic acid. It is more preferable to use acrylic acid as the unsaturated carboxylic acid.

It is preferable that the polymer particles include the repeating unit derived from the unsaturated carboxylic acid in an amount of 1 to 10 parts by mass, and more preferably 2.5 to 7.5 parts by mass, based on 100 parts by mass of the polymer particles.

2.1.3. Additional Unsaturated Monomer

The polymer particles may further include a repeating unit derived from an additional unsaturated monomer that is copolymerizable with the fluorine-containing monomer and the unsaturated carboxylic acid.

Examples of the additional unsaturated monomer include a polyfunctional monomer, an unsaturated carboxylate (excluding an unsaturated carboxylate that falls under the fluorine-containing monomer (hereinafter the same)), an alpha,beta-unsaturated nitrile compound, and the like.

The polyfunctional monomer is a monomer that includes two or more polymerizable unsaturated bonds. A (poly)(meth)acrylate of a polyhydric alcohol, a conjugated diene compound, or the like may preferably be used as the polyfunctional monomer. Examples of the (poly)(meth)acrylate of a polyhydric alcohol include ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, and the like. Examples of the conjugated diene compound include 1,3-butadiene, 2-methyl-1,3-butadiene, 2,3-dimethyl-1,3-butadiene, 2-chloro-1,3-butadiene, and the like. Further examples of the polyfunctional monomer include divinylbenzene and the like. These polyfunctional monomers may be used either alone or in combination.

A (meth)acrylate may preferably be used as the unsaturated carboxylate. Examples of the (meth)acrylate include an alkyl (meth)acrylate, a cycloalkyl (meth)acrylate, a hydroxyalkyl (meth)acrylate, and the like. An alkyl (meth)acrylate having 1 to 10 carbon atoms is preferable as the alkyl (meth)acrylate. Examples of the alkyl (meth)acrylate having 1 to 10 carbon atoms include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, 2-ethylhexyl (meth)acrylate, n-octyl (meth)acrylate, nonyl (meth)acrylate, decyl (meth)acrylate, and the like. Examples of the cycloalkyl (meth)acrylate include cyclohexyl (meth)acrylate and the like. Examples of the hydroxyalkyl (meth)acrylate include hydroxymethyl (meth)acrylate, hydroxyethyl (meth)acrylate, and the like. These unsaturated carboxylates may be used either alone or in combination. Among these, it is preferable to use an alkyl (meth)acrylate. It is more preferable to use one or more compounds selected from methyl (meth)acrylate, ethyl (meth)acrylate, n-butyl (meth)acrylate, and 2-ethylhexyl (meth)acrylate.

Examples of the alpha,beta-unsaturated nitrile compound include acrylonitrile, methacrylonitrile, alpha-chloroacrylonitrile, alpha-ethylacrylonitrile, vinylidene cyanide, and the like. The alpha,beta-unsaturated nitrile compound may be one or more compounds selected from these compounds. It is preferable to use one or more compounds selected from acrylonitrile and methacrylonitrile. It is particularly preferable to use acrylonitrile.

Further examples of the additional unsaturated monomer include aromatic vinyl compounds such as styrene, alpha-methylstyrene, p-methylstyrene, and chlorostyrene; alkylamides of an unsaturated carboxylic acid, such as (meth)acrylamide and N-methylolacrylamide; aminoalkylamides of an unsaturated carboxylic acid, such as aminoethylacrylamide, dimethylaminomethylmethacrylamide, and methylaminopropylmethacrylamide; and the like. The additional unsaturated monomer may be one or more compounds selected from these compounds.

2.1.4. Number Average Particle Size (Da) of Polymer Particles

It is preferable that the polymer particles have a number average particle size (Da) of 20 to 450 nm, more preferably 30 to 420 nm, and particularly preferably 50 to 400 nm.

When the number average particle size (Da) of the polymer particles is within the above range, the stability of the composition is improved, and an increase in internal resistance (resistance increase ratio) can be suppressed even if the protective film is formed in the electrical storage device. If the number average particle size (Da) is less than the above range, since the solubility of the polymer particles in the electrolyte solution increases due to an increase in surface area, the polymer particles may be gradually eluted into the electrolyte solution when the electrical storage device is repeatedly charged and discharged, and an increase in internal resistance may occur. If the number average particle size (Da) exceeds the above range, since adhesion of the polymer particles decreases due to a decrease in surface area, it may be difficult to form a strong protective film, and the electrical storage device may not exhibit sufficient durability.

The number average particle size (Da) of the polymer particles (A) refers to a particle size (D50) at 50% in a cumulative particle size distribution measured by a light scattering particle size analyzer. Examples of the light scattering particle size analyzer include Coulter LS230, Coulter LS 100, and Coulter LS 13 320 (manufactured by Beckman Coulter, Inc.); FPAR-1000 (Otsuka Electronics Co., Ltd.); and the like. These particle size distribution analyzers can measure the particle size distribution of the primary particles of the polymer particles, and can also measure the particle size distribution of the secondary particles that are formed through aggregation of the primary particles. Therefore, the particle size distribution measured by these particle size distribution analyzers can be used as an index of the dispersion state of the polymer particles included in the composition.

2.1.5. Tetrahydrofuran (THF) Insoluble Content

The THF insoluble content in the polymer particles is preferably 80% or more, and more preferably 85% or more. It is considered that the THF insoluble content in the polymer particles is almost proportional to the content of components that are insoluble in the electrolyte solution used for the electrical storage device. When the THF insoluble content in the polymer particles is within the above range, it is considered that elution of the polymer particles into the electrolyte solution can be suppressed even when the electrical storage device that is produced using the polymer particles is repeatedly charged and discharged for a long time.

2.1.6. Configuration of Polymer Particles

The polymer particles may be (1) copolymer particles obtained by synthesizing polymer particles that include a repeating unit derived from a fluorine-containing monomer, and a repeating unit derived from an unsaturated carboxylic acid through single-stage polymerization, or (2) composite particles that include a polymer A that includes a repeating unit derived from a fluorine-containing monomer, and a polymer B that includes a repeating unit derived from an unsaturated carboxylic acid. It is preferable that the polymer particles be the composite particles due to excellent oxidation resistance. It is more preferable that the composite particles be a polymer alloy.

The term "polymer alloy" is defined in *Iwanami Rikagaku Jiten* (5th ed., Iwanami Shoten, Publishers) as "a generic name for multi-component polymers that are obtained by mixing or chemically bonding two or more polymers". The term "polymer alloy" defined in *Iwanami Rikagaku Jiten* refers to "a polymer blend in which different polymers are physically mixed, a block or graft copolymer in which different polymer components are covalently bonded, a polymer complex in which different polymers are associated due to an intermolecular force, an interpenetrating polymer network (IPN) in which different polymers are entangled, and the like". Note that the polymer alloy included in the protective film-forming composition is formed of an IPN in which different polymer components are not covalently bonded.

It is considered that the polymer A that forms the polymer alloy particles exhibits excellent electrolyte solution permeability/retention capability, and hard segments formed of a crystalline resin aggregate in the polymer A to form a pseudo crosslinking point (e.g., C—H . . . F—C) in the main chain. When only the polymer A is mixed with the inorganic particles, and used to form the protective film of the electrical storage device, excellent electrolyte solution permeability/retention capability and oxidation resistance are achieved, but insufficient adhesion and flexibility tend to be obtained. As a result, it may be impossible to sufficiently bind the inorganic particles included in the protective film, and the protective film may become nonuniform due to removal of the inorganic particles. Therefore, it may be impossible to obtain an electrical storage device having a small resistance increase ratio. The polymer B that forms the polymer alloy particles exhibits excellent adhesion and flexibility, but tends to exhibit poor oxidation resistance. Therefore, when only the polymer B is used to form the protective film of the electrical storage device, oxidative decomposition may occur due to repeated charge and discharge, or overcharge, and it may be impossible to obtain an electrical storage device having a small resistance increase ratio.

In contrast, an electrical storage device that achieves electrolyte solution permeability/retention capability, oxidation resistance, adhesion, and flexibility can be achieved at the same time, and has a small resistance increase ratio can be produced by utilizing the polymer alloy particles that includes the polymer A and the polymer B. Note that oxidation resistance can be further improved when the polymer alloy particles include only the polymer A and the polymer B.

It is preferable that the polymer alloy particles have only one endothermic peak within the temperature range of −50 to +250° C. when subjected to differential scanning calorimetry (DSC) in accordance with JIS K 7121. It is more preferable that the polymer alloy particles have the only one endothermic peak within the temperature range of −30 to +30° C.

The polymer A that forms the polymer alloy particles normally has an endothermic peak (melting temperature) at −50 to +250° C. when the polymer A is present alone. The polymer B that forms the polymer alloy particles normally has an endothermic peak (glass transition temperature) that differs from that of the polymer A. Therefore, when the polymer A and the polymer B are present in the polymer particles in a phase separation state (e.g., core-shell structure), two endothermic peaks should be detected within the temperature range of −50 to +250° C. When the polymer particles have only one endothermic peak within the temperature range of −50 to +250° C., it is considered that the polymer particles are polymer alloy particles.

When the polymer alloy particles have only one endothermic peak within the temperature range of −30 to +30° C., the polymer alloy particles provide excellent flexibility and tackiness, and further improve adhesion.

The polymer A may further include a repeating unit derived from an additional unsaturated monomer in addition to the repeating unit derived from a fluorine-containing monomer. Examples of the additional unsaturated monomer include the polyfunctional monomers, the unsaturated carboxylic acids, the unsaturated carboxylates, the alpha,beta-unsaturated nitrile compounds, and the like mentioned above.

It is preferable that the polymer A include the repeating unit derived from a fluorine-containing monomer in an amount of 80 parts by mass or more, and more preferably 90 parts by mass or more, based on 100 parts by mass of the polymer A. In this case, it is preferable that the fluorine-containing monomer be at least one compound selected from vinylidene fluoride, tetrafluoroethylene, and hexafluoropropylene.

It is more preferable that the polymer A include a repeating unit derived from vinylidene fluoride in an amount of 50 to 99 parts by mass, and more preferably 80 to 98 parts by mass, based on 100 parts by mass of the polymer A, include a repeating unit derived from tetrafluoroethylene in an amount of 50 parts by mass or less, more preferably 1 to 30 parts by mass, and particularly preferably 2 to 20 parts by mass, based on 100 parts by mass of the polymer A, and/or include a repeating unit derived from hexafluoropropylene in an amount of 50 parts by mass or less, more preferably 1 to 30 parts by mass, and particularly preferably 2 to 25 parts by mass, based on 100 parts by mass of the polymer A. It is most preferable that the polymer A include only a repeating unit derived from at least one compound selected from the group consisting of vinylidene fluoride, tetrafluoroethylene, and hexafluoropropylene.

The polymer B may further include a repeating unit derived from an additional unsaturated monomer in addition to the repeating unit derived from an unsaturated carboxylic acid. Examples of the additional unsaturated monomer include the polyfunctional monomers, the unsaturated carboxylates, the alpha,beta-unsaturated nitrile compounds, and the like mentioned above.

It is preferable that the polymer B include the repeating unit derived from an unsaturated carboxylic acid in an amount of 2 to 20 parts by mass, and more preferably 3 to 15 parts by mass, based on 100 parts by mass of the polymer B.

The polymer alloy particles may be synthesized using an arbitrary method as long as the polymer alloy particles have the above configuration. For example, the polymer alloy particles can be easily synthesized using a known emulsion polymerization method or an appropriate combination of known emulsion polymerization methods.

For example, the polymer A that includes the repeating unit derived from a fluorine-containing monomer is synthesized using a known method. After the addition of the monomer used to produce the polymer B to the polymer A, the monomer is allowed to be sufficiently absorbed in the network structure of the polymer A (polymer particles), and polymerized in the network structure of the polymer A to synthesize the polymer B to obtain polymer alloy particles. When producing the polymer alloy particles using the above method, it is necessary to allow the monomer used to produce the polymer B to be sufficiently absorbed in the polymer A. If the absorption temperature is too low, or the absorption time is too short, a core-shell polymer, or a polymer in which part of the surface layer has an IPN structure may be obtained (i.e., the desired polymer alloy particles may not be obtained). If the absorption temperature is too high, the pressure inside the polymerization system may increase to a large extent, and it may be difficult to handle the reaction system, and control the reaction. Note that advantageous results may not be obtained even if the absorption time is increased to a large extent.

It is preferable to set the absorption temperature to 30 to 100° C., and more preferably 40 to 80° C. It is preferable to set the absorption time to 1 to 12 hours, and more preferably 2 to 8 hours. It is preferable to increase the absorption time when the absorption temperature is low. It suffices to employ a short absorption time when the absorption temperature is high. It is preferable to employ appropriate conditions so that the value obtained by multiplying the absorption temperature (° C.) by the absorption time (h) is about 120 to about 300 (° C.·h), and preferably 150 to 250 (° C.·h).

It is preferable to allow the monomer used to produce the polymer B to be absorbed in the network structure of the polymer A in a known medium (e.g., water) used for emulsion polymerization.

It is preferable that the polymer alloy particles include the polymer A in an amount of 5 to 50 parts by mass, more preferably 15 to 40 parts by mass, and particularly preferably 20 to 30 parts by mass, based on 100 parts by mass of the polymer alloy particles. When the polymer alloy particles include the polymer A in an amount within the above range, it is possible to achieve electrolyte solution permeability/retention capability, oxidation resistance, and adhesion in a well-balanced manner. When using the polymer B in which the content of the repeating unit derived from each monomer is within the above preferable range, the content of each repeating unit in the entire the polymer alloy particles can be set within the above preferable range when the polymer alloy particles include the polymer A within the above range. Since the ethylene carbonate (EC)/diethyl carbonate (DEC) insoluble content can thus be set to an appropriate value, the resistance increase ratio of the resulting electrical storage device sufficiently decreases.

2.1.7. Method for Producing Polymer Particles (Emulsion Polymerization Conditions)

Single-stage polymerization of the polymer that includes the repeating unit derived from a fluorine-containing monomer and the repeating unit derived from an unsaturated carboxylic acid, polymerization of the polymer A, and polymerization of the polymer B in the presence of the polymer A, may be effected in the presence of a known initiator, molecular weight modifier, emulsifier (surfactant), and the like.

Examples of the initiator include water-soluble initiators such as sodium persulfate, potassium persulfate, and ammonium persulfate; oil-soluble initiators such as benzoyl peroxide, lauryl peroxide, and 2,2'-azobisisobutyronitrile; redox initiators that include a reducing agent (e.g., sodium bisulfate, iron(II) salt, or tertiary amine) and an oxidizing agent (e.g., persulfate or organic peroxide); and the like. These initiators may be used either alone or in combination.

The initiator is preferably used in an amount of 0.3 to 3 parts by mass based on 100 parts by mass of the total monomer (i.e., the total monomer used when producing the polymer particles through single-stage polymerization, the total monomer that produces the polymer A when producing the polymer A, or the total monomer that produces the polymer B when producing the polymer B in the presence of the polymer A (hereinafter the same)).

Examples of the molecular weight modifier include halogenated hydrocarbons such as chloroform and carbon tetrachloride; mercaptan compounds such as n-hexylmercaptan, n-octylmercaptan, n-dodecylmercaptan, t-dodecylmercaptan, and thioglycolic acid; xanthogen compounds such as dimethyl xanthogen disulfide and diisopropyl xanthogen disulfide; terpinolene; an alpha-methylstyrene dimer; and the like. These molecular weight modifiers may be used either alone or in combination. The molecular weight modifier is preferably used in an amount of 5 parts by mass or less based on 100 parts by mass of the total monomer.

Examples of the emulsifier include an anionic surfactant, a nonionic surfactant, an amphoteric surfactant, a fluorine-based surfactant, and the like.

Examples of the anionic surfactant include a sulfate of a higher alcohol, an alkylbenzenesulfonate, an aliphatic sulfonate, a sulfate of a polyethylene glycol alkyl ether, and the like. Examples of the nonionic surfactant include an alkyl ester of polyethylene glycol, an alkyl ether of polyethylene glycol, an alkyl phenyl ether of polyethylene glycol, and the like.

Examples of the amphoteric surfactant include a compound in which an anion moiety is a carboxylate, a sulfate salt, a sulfonate, a phosphate salt, or the like, and a cation moiety is an amine salt, a quaternary ammonium salt, or the like. Specific examples of the amphoteric surfactant include betaine compounds such as lauryl betaine and stearyl betaine; and amino acid-type surfactants such as lauryl-beta-alanine, lauryl-di(aminoethyl)glycine, and octyl-di(aminoethyl)glycine.

Examples of the fluorine-based surfactant include a fluorobutylsulfonate, a phosphate that includes a fluoroalkyl group, a carboxylate that includes a fluoroalkyl group, a fluoroalkyl ethylene oxide adduct, and the like. Examples of a commercially available product of the fluorine-based surfactant include EFTOP EF301, EFTOP EF303, and EFTOP EF352 (manufactured by Tohkem Products Corporation); Megafac F171, Megafac F172, and Megafac F173 (manufactured by DIC Corporation); Fluorad FC430 and Fluorad FC431 (manufactured by Sumitomo 3M, Ltd.); Asahi Guard AG710, Surflon S-381, Surflon SC-382, Surflon SC101, Surflon SC102, Surflon SC103, Surflon SC104, Surflon SC105, Surflon SC106, Surfynol E1004, Surfynol KH-10, Surfynol KH-20, Surfynol KH-30, and Surfynol KH-40 (manufactured by Asahi Glass Co., Ltd.); Ftergent 250, Ftergent 251, Ftergent 222F, and Ftergent FTX-218 (manufactured by NEOS Co., Ltd.); and the like. These emulsifiers may be used either alone or in combination.

The emulsifier is preferably used in an amount of 0.01 to 10 parts by mass, more preferably 0.02 to 5 parts by mass, based on 100 parts by mass of the total monomer.

It is preferable to effect emulsion polymerization in an appropriate aqueous medium. It is particularly preferable to effect emulsion polymerization in water. The total monomer concentration in the aqueous medium may be 10 to 50 mass %, and is preferably 20 to 40 mass %.

It is preferable to effect emulsion polymerization at 40 to 85° C. for 2 to 24 hours. It is more preferable to effect emulsion polymerization at 50 to 80° C. for 3 to 20 hours.

2.2. Liquid Medium

The protective film-forming composition according to one embodiment of the invention includes the liquid medium. The liquid medium is preferably an aqueous medium that includes water. The aqueous medium may include a small amount of non-aqueous medium in addition to water. Examples of the non-aqueous medium include amide compounds, hydrocarbons, alcohols, ketones, esters, amine compounds, lactones, sulfoxides, sulfone compounds, and the like. These non-aqueous media may be used either alone or in combination. The content of the non-aqueous medium in the aqueous medium is preferably 10 mass % or less, and more preferably 5 mass % or less. It is most preferable that the aqueous medium include only water.

When the protective film-forming composition according to one embodiment of the invention includes the aqueous medium (that preferably includes only water) as the medium, the protective film-forming composition has a low environmental impact, and is highly safe for the operator.

3. Protective Film-Forming Slurry

A protective film-forming slurry according to one embodiment of the invention includes the protective film-forming composition and inorganic particles. The protective film-forming slurry is a dispersion that is applied to the surface of the electrode and/or the separator, and dried to form a protective film on the surface of the electrode and/or the separator. Each component included in the protective film-forming slurry according to one embodiment of the invention is described in detail below. Note that the protective film-forming composition is the same as described above, and description thereof is omitted.

3.1. Inorganic Particles

The inorganic particles included in the protective film-forming slurry according to one embodiment of the invention improve the toughness of the resulting protective film.

Examples of the inorganic particles include titanium oxide (titania), aluminum oxide (alumina), zirconium oxide (zirconia), magnesium oxide (magnesia), silica, and the like. Among these, titanium oxide and aluminum oxide are preferable from the viewpoint of improving the toughness of the protective film. It is more preferable to use rutile-type titanium oxide since the toughness of the protective film is further improved.

The number average particle size (Db) of the inorganic particles is preferably 1 micrometers or less, and more preferably 0.1 to 0.8 micrometers. When the number average particle size (Db) of the inorganic particles is within the above range, it is possible to form a flat and flexible protective film that does not damage the separator or the electrode situated adjacent to the protective film even when coming in contact with the separator or the electrode. Therefore, the durability of the electrical storage device is improved. When using a porous film as the separator, it is preferable that the number average particle size (Db) of the inorganic particles be larger than the average pore size of the separator. This makes it possible to reduce damage applied to the separator, and prevent a situation in which the pores of the separator are clogged by the inorganic particles.

Note that the number average particle size (Db) of the inorganic particles refers to a particle size (D50) at 50% in a cumulative particle size distribution measured using a laser diffraction particle size analyzer. Examples of the laser diffraction particle size analyzer include HORIBA LA-300 and HORIBA LA-920 (manufactured by Horiba, Ltd.); and the like. These laser diffraction particle size analyzers can measure the particle size distribution of the primary particles of the inorganic particles, and can also measure the particle size distribution of the secondary particles that are formed through aggregation of the primary particles. Therefore, the number average particle size (Db) measured using these laser diffraction particle size analyzers can be used as an index of the dispersion state of the inorganic particles included in the protective film-forming slurry. The number average particle size (Db) of the inorganic particles may also be measured by centrifuging the protective film-forming slurry to precipitate the inorganic particles, removing the supernatant liquid, and analyzing the inorganic particles using the above method.

3.2. Additional Component

The protective film-forming slurry according to one embodiment of the invention may optionally include an additional component such as a conductivity-imparting agent, water, a non-aqueous medium, a thickener, or a surfactant.

3.2.1. Conductivity-imparting Agent

Examples of the conductivity-imparting agent include carbon materials such as graphite, activated carbon, acetylene black, furnace black, graphite, carbon fiber, and fullerene, and metal particles such as copper particles and nickel particles. It is preferable to use a material that does not undergo a reduction reaction with lithium. Acetylene black or furnace black may preferably be used as the conductivity-imparting agent. The conductivity-imparting agent is preferably used in an amount of 20 parts by mass or less, more preferably 1 to 15 parts by mass, and particularly preferably 2 to 10 parts by mass, based on 100 parts by mass of the inorganic particles.

3.2.2. Water

The protective film-forming slurry according to one embodiment of the invention may further include water. When the protective film-forming slurry includes water, the stability of the protective film-forming slurry is improved, and the protective film can be formed with good reproducibility. Since water has a high evaporation rate as compared with a high-boiling-point solvent (e.g., N-methylpyrrolidone) that is normally used for an electrode slurry, an improvement in productivity, suppression of migration of the particles, and the like are expected to be achieved due to a reduction in solvent removal time.

When the protective film-forming composition according to one embodiment of the invention includes water as the liquid medium, the protective film-forming slurry may include only water included in the protective film-forming composition, or may include water included in the protective film-forming composition, and water that is further added to the protective film-forming slurry.

3.2.3. Non-aqueous Medium

The protective film-forming slurry according to one embodiment of the invention may further include a non-aqueous medium in order to improve the applicability of the protective film-forming slurry. It is preferable that the non-aqueous medium have a normal boiling point of 80 to 350° C. Specific examples of the non-aqueous medium include amide compounds such as N-methylpyrrolidone, dimethylformamide, and N,N-dimethylacetamide; hydrocarbons such as toluene, xylene, n-dodecane, and tetralin; alcohols such as methanol, ethanol, isopropyl alcohol, 2-ethyl-1-hexanol, 1-nonanol, and lauryl alcohol; ketones such as acetone, methyl ethyl ketone, cyclohexanone, phorone, acetophenone, and isophorone; esters such as benzyl acetate, isopentyl butyrate, methyl lactate, ethyl lactate, and butyl lactate; amine compounds such as o-toluidine, m-toluidine, and p-toluidine; lactones such as gamma-butyrolactone and delta-butyrolactone; sulfoxide/sulfone compounds such as dimethyl sulfoxide and sulfolane; and the like. These non-aqueous media may be used either alone or in combination. When the protective film-forming composition includes water as the liquid medium, it is preferable to use a non-aqueous medium that is miscible with water.

3.2.4. Thickener

The protective film-forming slurry according to one embodiment of the invention may further include a thickener in order to improve the applicability of the protective film-forming slurry. Examples of the thickener include cellulose compounds such as carboxymethyl cellulose, methyl cellulose, hydroxypropyl cellulose, hydroxypropylmethyl cellulose, and hydroxyethyl cellulose; ammonium salts or alkali metal salts of the above cellulose compounds; polycarboxylic acids such as poly(meth)acrylic acid and a modified poly(meth)acrylic acid; alkali metal salts of the polycarboxylic acids; polyvinyl alcohol-based (co)polymers such as polyvinyl alcohol, a modified polyvinyl alcohol, and an ethylene/vinyl alcohol copolymer; water-soluble polymers such as a saponified product of a copolymer of a vinyl ester and an unsaturated carboxylic acid (e.g., (meth)acrylic acid, maleic acid, or fumaric acid); and the like. It is particularly preferable to use an alkali metal salt of carboxymethyl cellulose, hydroxypropylmethyl cellulose, hydroxyethyl cellulose, an alkali metal salt of poly(meth)acrylic acid, or the like as the thickener.

Examples of a commercially available alkali metal salt of carboxymethyl cellulose include CMC1120, CMC1150, CMC2200, CMC2280, and CMC2450 (manufactured by Daicel Chemical Industries, Ltd.); Metolose SH and Metolose SE (manufactured by Shin-Etsu Chemical Co., Ltd.); and the like.

When the protective film-forming slurry according to one embodiment of the invention includes the thickener, the content of the thickener in the protective film-forming slurry is preferably 5 mass % or less, and more preferably 0.1 to 3 mass %, based on the total solid content in the protective film-forming slurry.

3.2.5. Surfactant

The protective film-forming slurry according to one embodiment of the invention may further include a surfactant in order to improve the dispersibility and the dispersion stability of the protective film-forming slurry. Examples of the surfactant include those mentioned above (see "2.1.7. Method for producing polymer particles (emulsion polymerization conditions)").

3.3. Method for Preparing Protective Film-Forming Slurry

The protective film-forming slurry according to one embodiment of the invention preferably includes the polymer particles that include the repeating unit derived from a fluorine-containing monomer and the repeating unit derived from an unsaturated carboxylic acid in an amount of 0.1 to 15 parts by mass, more preferably 0.1 to 10 parts by mass, and particularly preferably 0.3 to 4 parts by mass, based on 100 parts by mass of the inorganic particles. When the protective film-forming slurry includes the inorganic particles and the polymer particles in amounts within the above range, the resulting protective film exhibits toughness and lithium ion permeability in a well-balanced manner, and the resistance increase ratio of the resulting electrical storage device can be reduced.

The protective film-forming slurry according to one embodiment of the invention is prepared by mixing the protective film-forming composition, the inorganic particles, and an optional additional component. Examples of a mixing means include a ball mill, a sand mill, a pigment disperser, a grinder, an ultrasonic disperser, a homogenizer, a planetary mixer, a Hobart mixer, and the like.

When mixing (stirring) the components to prepare the protective film-forming slurry according to one embodiment of the invention, it is necessary to select a mixer that can stir the components so that aggregates of the inorganic particles do not remain in the resulting slurry, and select necessary and sufficient dispersion conditions. It is preferable to mix and disperse the components so that the resulting slurry does not include aggregates having a size of more than 20 micrometers. The degree of dispersion may be measured using a grind gage.

Since the protective film-forming slurry includes the protective film-forming composition, it is possible to form an electrode provided with a protective film that ensures excellent adhesion between the inorganic particles, excellent adhesion between the inorganic particles and the electrode, and excellent adhesion between the inorganic particles and the separator. An electrical storage device that includes such an electrode show a sufficiently low resistance increase ratio.

4. Examples

The invention is further described below by way of examples. Note that the invention is not limited to the following examples. In the examples and comparative examples, the unit "parts" refers to "parts by mass", and the unit "%" refers to "mass %" unless otherwise specified.

4.1 Example 1

4.1.1. Synthesis of Polymer A

An autoclave (internal volume: about 6 L) equipped with an electromagnetic stirrer, of which the internal atmosphere had been sufficiently replaced with nitrogen, was charged with 2.5 L of deoxidized purified water and 25 g of ammonium perfluorodecanoate (emulsifier). The mixture was heated to 60° C. with stirring at 350 rpm. The autoclave was then charged with a gas mixture of vinylidene fluoride (VDF) (70%) and hexafluoropropylene (HFP) (30%) until the internal pressure reached 20 $kg/cm^2$. 25 g of a CFC-113 solution including 20% of diisopropyl peroxydicarbonate (initiator) was injected into the autoclave using nitrogen gas to initiate polymerization. The internal pressure was maintained at 20 $kg/cm^2$ during polymerization by successively injecting a gas mixture of VDF (60.2%) and HFP (39.8%). Since the polymerization rate decreased along with the progress of polymerization, 25 g of a CFC-113 solution including 20% of diisopropyl peroxydicarbonate was again injected using nitrogen gas when 3 hours had elapsed, and the monomers were polymerized for a further 3 hours. The reaction mixture was cooled without stirring, and unreacted monomers were removed to obtain an aqueous dispersion including fine particles of a polymer A (content: 40%). The mass ratio (VDF/HFP) of VDF to HFP in the polymer A determined by $^{19}F$-NMR analysis was 21/4.

4.1.2. Production of Polymer Alloy Particles

A 7 L separable flask, of which the internal atmosphere had been sufficiently replaced with nitrogen, was charged with 1600 g of the aqueous dispersion including the fine particles of the polymer A (polymer A: 25 parts by mass), 0.5 parts by mass of Adeka Reasoap SR1025 (manufactured by Adeka Corporation) (emulsifier), 30 parts by mass of methyl methacrylate (MMA), 40 parts by mass of 2-ethylhexyl acrylate (EHA), 5 parts by mass of methacrylic acid (MAA), and 130 parts by mass of water. The mixture was stirred at 70° C. for 3 hours to allow the monomers to be absorbed in the polymer A. After the addition of 20 mL of a tetrahydrofuran solution including 0.5 parts by mass of azobisisobutyronitrile (oil-soluble initiator), the mixture was reacted at 75° C. for 3 hours, and then reacted at 85° C. for 2 hours. After cooling the mixture to terminate the reaction, the pH of the mixture was adjusted to 7 using a 2.5N sodium hydroxide aqueous solution to obtain a protective film-forming composition including polymer particles including the polymer A and a polymer B (concentration: 40%).

The particle size distribution of the protective film-forming composition was determined using a dynamic light scattering particle size analyzer ("FPAR-1000" manufactured by Otsuka Electronics Co., Ltd.), and the particle size (D50) was determined from the particle size distribution. It was found that the number average particle size (Da) was 330 nm.

About 10 g of the protective film-forming composition was weighed on a Teflon (registered trademark) petri dish (diameter: 8 cm), and dried at 120° C. for 1 hour to form a film. 1 g of the resulting film (polymer) was immersed in 400 mL of tetrahydrofuran (THF), followed by shaking at 50° C. for 3 hours. After filtering the THF phase through a wire gauze (300 mesh) to separate THF insoluble components, THF contained in the filtrate was evaporated off, and the weight (Y (g)) of the residue was measured. The THF insoluble content in the polymer particles was calculated by the following expression (2), and found to be 85%.

$$THF \text{ insoluble content}(\%)=((1-Y)/1)\times 100 \quad (2)$$

The film (polymer) was subjected to differential scanning calorimetry (DSC). Since the melting temperature (Tm) was not observed, and a single glass transition temperature (Tg) was observed at −5° C., it is considered that the resulting polymer particles were polymer alloy particles.

4.1.3. Preparation of Protective Film-Forming Slurry 20 parts by mass (based on 100 parts by mass of water) of titanium oxide ("KR380" manufactured by Titan Kogyo Ltd., rutile type, number average particle size: 0.38 micrometers) (inorganic particles), 5 parts by mass (solid basis) (based on 100 parts by mass of the inorganic particles) of the protective film-forming composition, and 1 part by mass of a thickener ("CMC1120" manufactured by Daicel Corporation) were mixed and dispersed using a mixer ("T.K. Filmix (registered trademark) Model 56-50" manufactured by PRIMIX Corporation) to prepare a protective film-forming slurry in which titanium oxide was dispersed.

4.1.4. Production of Cathode

<Preparation of Cathode Active Material>

Commercially available lithium iron phosphate (LiFePO$_4$) was ground using an agate mortar, and classified using a sieve to prepare active material particles having a particle size (D50) of 0.5 micrometers.

<Preparation of Cathode Slurry>

A twin-screw planetary mixer ("TK HIVIS MIX 2P-03" manufactured by PRIMIX Corporation) was charged with 4 parts by mass (solid basis) of polyvinylidene fluoride (PVDF), 100 parts by mass of the active material particles, 5 parts by mass of acetylene black, and 68 parts by mass of N-methylpyrrolidone (NMP), and the mixture was stirred at 60 rpm for 1 hour. After the addition of 32 parts by mass of NMP, the mixture was stirred for 1 hour to obtain a paste. The paste was stirred at 200 rpm for 2 minutes, stirred at 1800 rpm for 5 minutes, and stirred at 1800 rpm for 1.5 minutes under vacuum (about 5.0×10$^3$ Pa) using a stirrer/deaerator ("THINKY Mixer (Awatori Rentarou)" manufactured by THINKY Corporation) to prepare a cathode slurry.

<Production of Cathode>

The cathode slurry was uniformly applied to the surface of an aluminum foil collector using a doctor blade method so that the thickness after drying was 100 micrometers, and dried at 120° C. for 20 minutes. The resulting film was pressed using a roll press so that the film (active material layer) had a density of 2.0 g/cm$^3$ to obtain a cathode.

<Formation of Protective Film>

The protective film-forming slurry obtained as described above (see "4.1.3. Preparation of protective film-forming slurry") was uniformly applied to the surface of the cathode active material layer using a die coating method, and dried at 120° C. for 5 minutes to form a protective film on the surface of the cathode active material layer. The thickness of the protective film was 3 micrometers.

4.1.5. Production of Anode

<Preparation of Anode Slurry>

A twin-screw planetary mixer ("TK HIVIS MIX 2P-03" manufactured by PRIMIX Corporation) was charged with 4 parts by mass (solid basis) of polyvinylidene fluoride (PVDF), 100 parts by mass of graphite (anode active material), and 80 parts by mass of N-methylpyrrolidone (NMP). The mixture was stirred at 60 rpm for 1 hour. After the addition of 20 parts by mass of NMP, the mixture was stirred at 200 rpm for 2 minutes, stirred at 1800 rpm for 5 minutes, and stirred at 1800 rpm for 1.5 minutes under vacuum using a stirrer/deaerator ("THINKY Mixer (Awatori Rentarou)" manufactured by THINKY Corporation) to prepare an anode slurry.

<Production of Anode>

The anode slurry was uniformly applied to the surface of a copper foil collector using a doctor blade method so that the thickness after drying was 150 micrometers, and dried at 120° C. for 20 minutes. The film was then pressed using a roll press so that the film had a density of 1.5 g/cm$^3$ to obtain an anode.

4.1.6. Assembly of Lithium-Ion Battery Cell

In a gloved box of which the internal atmosphere had been replaced with argon (Ar) so that the dew point was −80° C., an anode (diameter: 16.16 mm) obtained by punching the anode produced as described above (see "4.1.5. Production of anode") was placed on a two-electrode coin cell ("HS Flat Cell" manufactured by Hohsen Corporation). A separator ("Celgard #2400" manufactured by Celgard, LLC.) (diameter: 24 mm) obtained by punching a polypropylene porous film was placed on the anode, and 500 microliters of an electrolyte solution was injected into the two-electrode coin cell while avoiding entrance of air. A cathode (diameter: 15.95 mm) obtained by punching the cathode produced as described above (see "4.1.4. Production of cathode") was placed on the separator so that the separator was opposite to the protective film formed on the cathode, and the outer casing of the two-electrode coin cell was air-tightly secured using a screw to obtain a lithium-ion battery cell (electrical storage device). Note that the electrolyte solution was prepared by dissolving LiPF$_6$ in ethylene carbonate/ethylmethyl carbonate (mass ratio=1/1) at a concentration of 1 mol/L.

4.1.7. Measurement of Residual Capacity Ratio and Resistance Increase Ratio

The battery cell produced as described above was placed in a thermostat bath (25° C.), charged at a constant current (0.1C), charged at a constant voltage (4.1 V) when the voltage reached 4.1 V, and determined to be fully charged (cut-off) when the current value reached 0.01C. The battery cell was then discharged at a constant current (0.2 C), and determined to be fully discharged (cut-off) when the voltage reached 2.5 V (aging charge/discharge).

The battery cell was then placed in a thermostat bath (25° C.), charged at a constant current (0.1C), charged at a constant voltage (4.1 V) when the voltage reached 4.1 V, and determined to be fully charged (cut-off) when the current value reached 0.01C. The battery cell was then discharged at a constant current (0.2 C), and determined to be fully discharged (cut-off) when the voltage reached 2.5 V, and the discharge capacity (initial value) (C1) at 0.2 C was measured.

The battery cell was then placed in a thermostat bath (25° C.), charged at a constant current (0.1C), charged at a constant voltage (4.1 V) when the voltage reached 4.1 V, and determined to be fully charged (cut-off) when the current value reached 0.01C.

The charged cell was subjected to electrochemical impedance spectroscopy (EIS) to measure the initial resistance value EISa.

The battery cell was then placed in a thermostat bath (60° C.), charged at a constant current (0.2C), and charged at a constant voltage (4.4 V) when the voltage reached 4.4 V (168 hours) (accelerated overcharge test).

The charged cell was placed in a thermostat bath (25° C.) so that the temperature of the cell decreased to 25° C., discharged at a constant current (0.2 C), and determined to be fully discharged (cut-off) when the voltage reached 2.5 V, and the discharge capacity (after test) (C2) at 0.2 C was measured.

The battery cell was then placed in a thermostat bath (25° C.), charged at a constant current (0.1C), charged at a constant voltage (4.1 V) when the voltage reached 4.1 V, and determined to be fully charged (cut-off) when the current value reached 0.01C. The battery cell was then discharged at a constant current (0.2 C), and determined to be fully discharged (cut-off) when the voltage reached 2.5 V. The cell was subjected to EIS to measure a resistance value EISb after applying thermal stress and overcharge stress.

The residual capacity ratio calculated by substituting the measured values in the following expression (3) was 80.5%, and the resistance increase ratio calculated by substituting the measured values in the following expression (4) was 210%.

$$\text{Residual capacity ratio}(\%) = (C2/C1) \times 100 \quad (3)$$

$$\text{Resistance increase ratio}(\%) = (EISb/EISa) \times 100 \quad (4)$$

The durability was evaluated to be acceptable when the residual capacity ratio was 75% or more, and the resistance increase ratio was 300% or less.

Note that "1 C" refers to a current value that requires 1 hour to fully discharge a cell having a specific electrical capacitance. For example, "0.1 C" refers to a current value that requires 10 hours to fully discharge the cell, and "10 C" refers to a current value that requires 0.1 hours to fully discharge the cell.

4.2. Examples 2 to 8, 10 to 12, 16 to 23, and 25

<Preparation of Protective Film-Forming Composition>

An aqueous dispersion including fine particles of a polymer A having the composition shown in Tables 1 to 3 was prepared in the same manner as in Example 1 (see "4.1.1. Production of polymer A"), except that the composition of the monomer gas and the amount of the emulsifier were appropriately changed. Water was removed under reduced pressure, or added, depending on the solid content in the aqueous dispersion to obtain an aqueous dispersion having a solid content of 40%.

A protective film-forming composition including polymer particles having the number average particle size shown in Tables 1 to 3 was prepared in the same manner as in Example 1 (see "4.1.2. Synthesis of polymer alloy particles"), except that the resulting aqueous dispersion was used in the amount (solid basis) shown in Tables 1 to 3, the amount (parts by mass) of each monomer, and the temperature and the time when the monomer was absorbed in the polymer A were changed as shown in Tables 1 to 3, and the amount of the emulsifier was appropriately changed. In Example 12, since the operation that allows the monomer to be absorbed in the polymer A was omitted, core-shell particles in which the surface of the polymer A was covered with the polymer B were obtained.

The resulting fine particles were subjected to measurement of the THF insoluble content and DSC measurement (glass transition temperature (Tg), melting temperature (Tm), and whether the fine particles were polymer alloy particles). The results are shown in Tables 1 to 3.

<Formation of Protective Film, and Production and Evaluation of Electrical Storage Device>

A protective film-forming slurry having the composition shown in Tables 1 to 3 was prepared in the same manner as in Example 1, except that the material obtained as described above was used, and an electrical storage device was produced using the protective film-forming slurry, and evaluated. The evaluation results are shown in Tables 1 to 3.

4.3. Examples 9 and 24

<Preparation of Protective Film-Forming Composition>

A protective film-forming composition was prepared by replacing the solvent included in the protective film-forming composition prepared in Example 1 (see "4.1.2. Synthesis of polymer alloy particles") with gamma-butyrolactone (GBL). The protective film-forming composition was cloudy, and the components were not dissolved in the solvent.

A protective film-forming slurry was prepared in the same manner as in Example 1 (see "4.1.3. Preparation of protective film-forming slurry"), except that the protective film-forming composition obtained as described above (dispersion medium: GBL) was used, and GBL was used instead of water.

The resulting fine particles were subjected to measurement of the THF insoluble content and DSC measurement (glass transition temperature (Tg), melting temperature (Tm), and whether the fine particles were polymer alloy particles). The results are shown in Table 1 or 3.

<Formation of Protective Film, and Production and Evaluation of Electrical Storage Device>

A protective film-forming slurry having the composition shown in Table 1 or 3 was prepared in the same manner as in Example 1, except that the material obtained as described above was used, and an electrical storage device was produced using the protective film-forming slurry, and evaluated. The evaluation results are shown in Table 1 or 3.

4.4. Example 13

<Preparation of Protective Film-Forming Composition>

A 7 L separable flask was charged with 150 parts by mass of water and 0.2 parts by mass of sodium dodecylbenzenesulfonate, and the internal atmosphere of the separable flask was sufficiently replaced with nitrogen. Another vessel was charged with parts by 60 mass of water, 0.8 parts by mass (solid content) of an ether sulfate emulsifier ("Adeka Reasoap SR1025" manufactured by Adeka Corporation) (emulsifier), 20 parts by mass of 2,2,2-trifluoroethyl methacrylate (TFEMA) (monomer), 10 parts by mass of acrylonitrile (AN) (monomer), 25 parts by mass of methyl methacrylate (MMA) (monomer), 40 parts by mass of 2-ethylhexyl acrylate (EHA) (monomer), and 5 parts by mass of methacrylic acid (MAA) (monomer). The mixture was sufficiently stirred to obtain a monomer emulsion including the monomer mixture. The inside of the separable flask was heated to 60° C., and 0.5 parts by mass of ammonium persulfate (initiator) was added to the separable flask. When the temperature inside the separable flask reached 70° C., the monomer emulsion was slowly added to the separable flask over 3 hours while maintaining the temperature inside the separable flask at 70° C. After increasing the temperature inside the separable flask to 85° C., the monomers were polymerized at 85° C. for 3 hours. After cooling the separable flask to terminate the reaction, the pH of the mixture was adjusted to 7.6 using aqueous ammonia to obtain a protective film-forming composition including polymer particles (content: 30%).

The resulting fine particles were subjected to measurement of the THF insoluble content and DSC measurement (glass transition temperature (Tg), melting temperature (Tm), and whether the fine particles were polymer alloy particles). The results are shown in Table 3.

4.5. Examples 14 and 15

<Preparation of Protective Film-Forming Composition>

A protective film-forming composition including polymer particles having the number average particle size shown in Table 2 was prepared in the same manner as in Example 13, except that the types and the amounts (parts by mass) of the monomers were changed as shown in Table 2.

<Formation of Protective Film, and Production and Evaluation of Electrical Storage Device>

An electrical storage device was produced, and evaluated in the same manner as in Example 1, except that the material obtained as described above was used. The evaluation results are shown in Table 2.

4.6. Comparative Example 1

<Preparation of Protective Film-Forming Composition>

An aqueous dispersion including fine particles of a polymer A having the composition shown in Table 2 was prepared in the same manner as in Example 1 (see "4.1.1. Production of polymer A"), except that the composition of the monomer gas was changed. The aqueous dispersion was used as a protective film-forming composition (i.e., polymer alloy particles were not produced as described in "4.1.2. Synthesis of polymer alloy particles").

A protective film-forming slurry was prepared in the same manner as in Example 1 (see "4.1.3. Preparation of protective film-forming slurry"), except that the protective film-forming composition obtained as described above was used, and a cathode on which a protective film was formed, and an electrical storage device were produced and evaluated in the same manner as in Example 1. The evaluation results are shown in Table 2.

4.7. Comparative Example 2

<Preparation of Protective Film-Forming Composition>

An aqueous dispersion including polymer particles was prepared in the same manner as in Example 1 (see "4.1.2. Synthesis of polymer alloy particles"), except that the aqueous dispersion including the polymer A was not used, 1.0 part by mass of Adeka Reasoap SR1025 (emulsifier) and 145 parts by mass of water were used, and the amount (parts by mass) of the monomer producing the polymer B was changed as shown in Table 2. The resulting aqueous dispersion was used as a protective film-forming composition.

A protective film-forming slurry was prepared in the same manner as in Example 1 (see "4.1.3. Preparation of protective film-forming slurry"), except that the protective film-forming composition obtained as described above was used, and a cathode on which a protective film was formed, and an electrical storage device were produced and evaluated in the same manner as in Example 1. The evaluation results are shown in Table 2.

4.8. Comparative Example 3

<Synthesis of Polyimide>

A polyimide was synthesized using the method described in JP-A-2009-87562. Specifically, a four-necked flask equipped with a condenser and a nitrogen gas inlet was charged with 1.0 mol of 2,2-bis(3,4-dicarboxyphenyl)hexafluoropropane dianhydride, 0.95 mol of o-tolidine diisocyanate, and N-methyl-2-pyrrolidone (NMP) (solid content: 20 mass %). After the addition of 0.01 mol of diazabicycloundecene (catalyst), the mixture was stirred and reacted at 120° C. for 4 hours.

<Preparation of Protective Film-Forming Slurry>

A protective film-forming slurry was prepared in the same manner as in Example 1 (see "4.1.3. Preparation of protective film-forming slurry"), except that the NMP solution of polyimide obtained as described above was used as the binder solution, and NMP was used instead of water. A cathode on which a protective film was formed (binder: polyimide), and an electrical storage device were produced and evaluated in the same manner as in Example 1. The evaluation results are shown in Table 2.

4.9. Comparative Example 4

<Synthesis of Polyamideimide>

A polyamideimide was synthesized using the method described in JP-A-2007-154029. Specifically, a flask equipped with a condenser, a nitrogen gas inlet, and a stirrer was charged with 0.7 mol of trimellitic anhydride (TMA), 0.3 mol of 3,3',4,4'-benzophenonetetracarboxylic anhydride (BTDA), 1 mol of naphthalene diisocyanate (NDI), 0.01 mol of diazabicycloundecene (DBU), and N-methyl-2-pyrrolidone (NMP) (solid content: 15%), and the mixture was reacted at 80° C. for about 3 hours.

A protective film-forming slurry was prepared in the same manner as in Example 1 (see "4.1.3. Preparation of protective film-forming slurry"), except that the NMP solution of polyamideimide obtained as described above was used as the binder solution, and NMP was used instead of water. A cathode on which a protective film was formed (binder: polyamideimide), and an electrical storage device were produced and evaluated in the same manner as in Example 1. The evaluation results are shown in Table 2.

4.10. Comparative Example 5

A temperature-adjustable autoclave equipped with a stirrer was charged with 200 parts by mass of water, 0.6 parts by mass of sodium dodecylbenzene sulfonate, 1.0 part by mass of potassium persulfate, 0.5 parts by mass of sodium hydrogen sulfite, 0.5 parts by mass of an alpha-methylstyrene dimer, 0.3 parts by mass of dodecylmercaptan, and the monomers shown in Table 2 (see "Polymer(B)"). The mixture was heated to 70° C., and polymerized for 8 hours. The mixture was then heated to 80° C., and reacted for 3 hours to obtain a latex. The pH of the latex was adjusted to 7.5, followed by the addition of 5 parts by mass (solid basis) of potassium tripolyphosphate (10 mass % aqueous solution). The residual monomers were removed by steam distillation, and the residue was concentrated under reduced pressure to obtain an aqueous dispersion including styrene-butadiene rubber-based resin particles (polymer B) (content: 50 mass %).

The aqueous dispersion was mixed with the aqueous dispersion including the fine particles of the polymer A (content: 40%) prepared in Example 1 (see "4.1.1. Synthesis of polymer A") in the ratio shown in Table 2, and a necessary amount of water was added to the mixture to obtain a protective film-forming composition including polymer particles (content: 40%).

A protective film-forming slurry was prepared in the same manner as in Example 1 (see "4.1.3. Preparation of protective film-forming slurry"), except that the protective film-forming composition obtained as described above was used. A cathode on which a protective film was formed (binder: polyamideimide), and an electrical storage device were produced and evaluated in the same manner as in Example 1. The evaluation results are shown in Table 2.

4.11. Comparative Example 6

Polymerization was effected in the same manner as in Comparative Example 5, except that the monomer composition was changed as shown in Table 2 (see "Polymer B), to obtain an aqueous dispersion including acrylic-based resin particles (content: 50 mass %). The aqueous dispersion was mixed with the aqueous dispersion including the fine particle of the polymer A in the same manner as in Comparative Example 5 to prepare a protective film-forming composition, which was evaluated. The evaluation results are shown in Table 2.

4.12. Electrical Storage Device Evaluation Results

The composition of the polymer particles, the property evaluation results, and the electrical storage device evaluation results are shown in Tables 1 and 2.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Polymer particles | A[*1] | Fluorine-containing monomer | VDF (parts by mass) | 21 | 20 | 24 | 20 | 4 | 20 | 40 | 21 | 21 | 48 |
| | | | HFP (parts by mass) | 4 | 5 | 1 | — | 1 | 5 | 10 | 4 | 4 | 12 |
| | | | TFE (parts by mass) | — | — | — | 5 | — | — | — | — | — | — |
| | | | Amount (parts by mass) | 25 | 25 | 25 | 25 | 5 | 25 | 50 | 25 | 25 | 60 |
| | B[*2] | Fluorine-containing monomer | TFEMA (parts by mass) | — | — | — | — | — | — | — | — | — | — |
| | | | TFEA (parts by mass) | — | — | — | — | — | — | — | — | — | — |
| | | | HFIPA (parts by mass) | — | — | — | — | — | — | — | — | — | — |
| | | | Total (parts by mass) | — | — | — | — | — | — | — | — | — | — |
| | | Unsaturated carboxylate | MMA (parts by mass) | 30 | 30 | 30 | 30 | 30 | 10 | 20 | 30 | 30 | 15 |
| | | | EHA (parts by mass) | 40 | 40 | 40 | 40 | 40 | 40 | 25 | 40 | 40 | 20 |
| | | | BMA (parts by mass) | — | — | — | — | 10 | — | — | — | — | — |
| | | | BA (parts by mass) | — | — | — | — | 10 | — | — | — | — | — |
| | | | Total (parts by mass) | 70 | 70 | 70 | 70 | 90 | 50 | 45 | 70 | 70 | 35 |
| | | Unsaturated carboxylic acid | AA (parts by mass) | — | 5 | — | — | — | 5 | — | — | — | — |
| | | | MAA (parts by mass) | 5 | — | 5 | 5 | 5 | — | 5 | 5 | 5 | 5 |
| | | | Total (parts by mass) | 5 | 5 | 5 | 5 | 5 | 5 | 5 | 5 | 5 | 5 |
| | | Nitrile | AN (parts by mass) | — | — | — | — | — | 20 | — | — | — | — |
| | | Monomer absorption conditions | Temperature (° C.) | 70 | 50 | 40 | 80 | 60 | 60 | 30 | 70 | 70 | 70 |
| | | | Time (h) | 3 | 5 | 6 | 2 | 4 | 4 | 8 | 3 | 3 | 3 |
| | | Particle size (nm) | | 330 | 210 | 330 | 330 | 390 | 200 | 160 | 60 | 330 | 40 |
| | | THF insoluble content (wt %) | | 85 | 95 | 95 | 85 | 85 | 90 | 85 | 90 | 85 | 85 |
| | | DSC | Tg (° C.) | −5 | −5 | 1 | −2 | −10 | 0 | 5 | −5 | −5 | −5 |
| | | | Tm (° C.) | — | — | — | — | — | — | — | — | — | — |
| | | Polymer alloy? | | Yes | Yes | Yes | Yes | Yes | Yes | Yes | Yes | Yes | Yes |
| | | Dispersion medium | | Water | Water | Water | Water | Water | Water | Water | Water | GBL | Water |
| Inorganic particles | | Material | | Titanium oxide | Titanium oxide | Titanium oxide | Titanium oxide | Titanium oxide | Titanium oxide | Titanium oxide | Titanium oxide | Titanium oxide | Titanium oxide |
| | | Particle size (micrometers) | | 0.38 | 0.38 | 0.38 | 0.38 | 0.38 | 0.38 | 0.38 | 0.38 | 0.38 | 0.38 |
| | | Amount (parts by mass) of polymer particles based on 100 parts by mass of inorganic particles | | 5 | 5 | 5 | 5 | 5 | 5 | 5 | 5 | 5 | 5 |
| Electrical storage device | | Residual capacity ratio (%) | | 80.5 | 82.2 | 85.1 | 83.2 | 87.1 | 82.1 | 87.8 | 79.2 | 79.1 | 75.1 |
| | | Resistance increase ratio (%) | | 210 | 180 | 160 | 170 | 200 | 170 | 200 | 220 | 170 | 290 |

[*1]Polymer A
[*2]Polymer B

TABLE 2

| | | Example 11 | Example 12 | Example 13 | Example 14 | Example 15 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Polymer particles | A*1 Fluorine-containing monomer | | | | | | | | | | | |
| | VDF (parts by mass) | 20 | 20 | — | — | — | 80 | — | — | — | 10.5 | 21 |
| | HFP (parts by mass) | 5 | 5 | — | — | — | 20 | — | — | — | 2 | 4 |
| | TFE (parts by mass) | — | — | — | — | — | — | — | — | — | — | — |
| | B*2 Fluorine-containing monomer | | | | | | | | | | | |
| | Amount (parts by mass) | 25 | 25 | 20 | 20 | 20 | 100 | 0 | — | — | 12.5 | 25 |
| | TFEMA (parts by mass) | — | — | 20 | — | — | — | — | — | — | — | — |
| | TFEA (parts by mass) | — | — | — | 20 | — | — | — | — | — | — | — |
| | HFIPA (parts by mass) | — | — | — | — | 20 | — | — | — | — | — | — |
| | Unsaturated carboxylate | | | | | | | | | | | |
| | Total (parts by mass) | 70 | 30 | 65 | 50 | 70 | 0 | 70 | — | — | 10.5 | 75 |
| | MMA (parts by mass) | 50 | — | 20 | 20 | 20 | — | 30 | — | — | — | 35 |
| | EHA (parts by mass) | 20 | 30 | 25 | 10 | 30 | — | 40 | — | — | 10.5 | 40 |
| | BMA (parts by mass) | — | — | 40 | 40 | 40 | — | — | — | — | — | — |
| | BA (parts by mass) | — | — | — | — | — | — | — | — | — | — | — |
| | Unsaturated carboxylic acid | | | | | | | | | | | |
| | Total (parts by mass) | 5 | 5 | 5 | 5 | 5 | 0 | 5 | — | — | — | — |
| | AA (parts by mass) | 5 | 5 | 5 | 5 | 5 | — | 5 | — | — | — | — |
| | MAA (parts by mass) | — | — | — | — | — | — | — | — | — | — | — |
| | Nitrile | | | | | | | | | | | |
| | Total (parts by mass) | — | 5 | 5 | 5 | 5 | — | — | — | — | — | — |
| | AN (parts by mass) | — | 40 | 10 | 25 | 5 | — | — | — | — | — | — |
| | Other | | | | | | | | | | | |
| | BD (parts by mass) | — | — | — | — | — | — | — | — | — | 49 | — |
| | ST (parts by mass) | — | — | — | — | — | — | — | — | — | 30 | — |
| | Monomer absorption conditions | | | | | | | | | | | |
| | Temperature (° C.) | 70 | — | — | — | — | — | — | — | — | — | — |
| | Time (h) | 3 | — | — | — | — | — | — | — | — | — | — |
| | Polyimide | — | — | — | — | — | — | — | — | 100 | — | — |
| | Polyamideimide | — | — | — | — | — | — | — | 100 | — | — | — |
| | Particle size (nm) | 410 | 330 | 110 | 250 | 300 | 150 | 300 | — | — | 150 | 220 |
| | THF insoluble content (wt %) | 85 | 55 | 88 | 60 | 83 | 90 | 70 | — | — | 85 | 70 |
| | DSC Tg (° C.) | 35 | 20 | 5 | 15 | 0 | — | -9 | — | — | -28 | -2 |
| | Tm (° C.) | 115 | 115 | — | — | — | 115 | — | 250° C. or more | 250° C. or more | — | — |
| | Polymer alloy? | Yes | No | No | No | No | No | No | No | No | No | No |
| Dispersion medium | | Water | Water | Water | Water | Water | Water | Water | NMP | NMP | Water | Water |
| Inorganic particles | Material | Titanium oxide | Titanium oxide | Titanium oxide | Titanium oxide | Titanium oxide | Titanium oxide | Titanium oxide | Titanium oxide | Titanium oxide | Titanium oxide | Titanium oxide |
| | Particle size (micrometers) | 0.38 | 0.38 | 0.38 | 0.38 | 0.38 | 0.38 | 0.38 | 0.38 | 0.38 | 0.38 | 0.38 |
| | Amount (parts by mass) of polymer particles based on 100 parts by mass of inorganic particles | 5 | 5 | 5 | 5 | 5 | 5 | 5 | 5 | 5 | 5 | 5 |
| Electrical storage device | Residual capacity ratio (%) | 75.8 | 76.0 | 75.2 | 76.2 | 75.5 | 65.2 | 80.1 | 70.0 | 65.0 | 58.2 | 80.1 |
| | Resistance increase ratio (%) | 300 | 290 | 260 | 280 | 260 | 580 | 390 | 450 | 410 | 360 | 450 |

*¹Polymer A
*²Polymer B

TABLE 3

|  |  |  |  | Example 16 | Example 17 | Example 18 | Example 19 | Example 20 |
|---|---|---|---|---|---|---|---|---|
| Polymer particles | A*1 | Fluorine-containing monomer | VDF (parts by mass) | 21 | 20 | 24 | 20 | 4 |
|  |  |  | HFP (parts by mass) | 4 | 5 | 1 | — | 1 |
|  |  |  | TFE (parts by mass) | — | — | — | 5 | — |
|  |  |  | Amount (parts by mass) | 25 | 25 | 25 | 25 | 5 |
|  | B*2 | Fluorine-containing monomer | TFEMA (parts by mass) | — | — | — | — | — |
|  |  |  | TFEA (parts by mass) | — | — | — | — | — |
|  |  |  | HFIPA (parts by mass) | — | — | — | — | — |
|  |  |  | Total (parts by mass) | — | — | — | — | — |
|  |  | Unsaturated carboxylate | MMA (parts by mass) | 30 | 30 | 30 | 30 | 30 |
|  |  |  | EHA (parts by mass) | 40 | 40 | 40 | 40 | 40 |
|  |  |  | BMA (parts by mass) | — | — | — | — | 10 |
|  |  |  | BA (parts by mass) | — | — | — | — | 10 |
|  |  |  | Total (parts by mass) | 70 | 70 | 70 | 70 | 90 |
|  |  | Unsaturated carboxylic acid | AA (parts by mass) | — | 5 | — | — | — |
|  |  |  | MAA (parts by mass) | — | — | 5 | 5 | 5 |
|  |  |  | Total (parts by mass) | 5 | 5 | 5 | 5 | 5 |
|  |  | Nitrile | AN (parts by mass) | — | — | — | — | — |
|  |  | Monomer absorption conditions | Temperature (° C.) | 70 | 50 | 40 | 80 | 60 |
|  |  |  | Time (h) | 3 | 5 | 6 | 2 | 4 |
|  |  | Particle size (nm) |  | 330 | 210 | 330 | 330 | 390 |
|  |  | THF insoluble content (wt %) |  | 85 | 95 | 95 | 85 | 85 |
|  |  | DSC | Tg (° C.) | −5 | −5 | 1 | −2 | −10 |
|  |  |  | Tm (° C.) | — | — | — | — | — |
|  |  | Polymer alloy? |  | Yes | Yes | Yes | Yes | Yes |
|  |  | Dispersion medium |  | Water | Water | Water | Water | Water |
| Inorganic particles |  | Material |  | Aluminum oxide | Titanium oxide | Silica | Titanium oxide | Zirconium oxide |
|  |  | Particle size (micrometers) |  | 0.74 | 0.12 | 0.98 | 0.08 | 0.67 |
|  |  | Amount (parts by mass) of polymer particles based on 100 parts by mass of inorganic particles |  | 2 | 10 | 3 | 2 | 5 |
| Electrical storage device | | Residual capacity ratio (%) |  | 85.2 | 83.2 | 76 | 75.5 | 80.0 |
|  |  | Resistance increase ratio (%) |  | 150 | 280 | 290 | 270 | 200 |

|  |  |  |  | Example 21 | Example 22 | Example 23 | Example 24 | Example 25 |
|---|---|---|---|---|---|---|---|---|
| Polymer particles | A*1 | Fluorine-containing monomer | VDF (parts by mass) | 20 | 40 | 21 | 21 | 48 |
|  |  |  | HFP (parts by mass) | 5 | 10 | 4 | 4 | 12 |
|  |  |  | TFE (parts by mass) | — | — | — | — | — |
|  |  |  | Amount (parts by mass) | 25 | 50 | 25 | 25 | 60 |
|  | B*2 | Fluorine-containing monomer | TFEMA (parts by mass) | — | — | — | — | — |
|  |  |  | TFEA (parts by mass) | — | — | — | — | — |
|  |  |  | HFIPA (parts by mass) | — | — | — | — | — |
|  |  |  | Total (parts by mass) | — | — | — | — | — |
|  |  | Unsaturated carboxylate | MMA (parts by mass) | 10 | 20 | 30 | 30 | 15 |
|  |  |  | EHA (parts by mass) | 40 | 25 | 40 | 40 | 20 |
|  |  |  | BMA (parts by mass) | — | — | — | — | — |
|  |  |  | BA (parts by mass) | — | — | — | — | — |
|  |  |  | Total (parts by mass) | 50 | 45 | 70 | 70 | 35 |
|  |  | Unsaturated carboxylic acid | AA (parts by mass) | 5 | — | — | — | — |
|  |  |  | MAA (parts by mass) | — | 5 | 5 | 5 | 5 |
|  |  |  | Total (parts by mass) | 5 | 5 | 5 | 5 | 5 |
|  |  | Nitrile | AN (parts by mass) | 20 | — | — | — | — |
|  |  | Monomer absorption conditions | Temperature (° C.) | 60 | 30 | 70 | 70 | 70 |
|  |  |  | Time (h) | 4 | 8 | 3 | 3 | 3 |
|  |  | Particle size (nm) |  | 200 | 160 | 60 | 330 | 40 |
|  |  | THF insoluble content (wt %) |  | 90 | 85 | 90 | 85 | 85 |
|  |  | DSC | Tg (° C.) | 0 | 5 | −5 | −5 | −5 |
|  |  |  | Tm (° C.) | — | — | — | — | — |
|  |  | Polymer alloy? |  | Yes | Yes | Yes | Yes | Yes |
|  |  | Dispersion medium |  | Water | Water | Water | GBL | Water |
| Inorganic particles |  | Material |  | Magnesium oxide | Silica | Aluminum oxide | Aluminum oxide | Aluminum oxide |

TABLE 3-continued

|  | | | | | | |
|---|---|---|---|---|---|---|
|  | Particle size (micrometers) | 0.50 | 0.54 | 0.22 | 0.74 | 0.22 |
|  | Amount (parts by mass) of polymer particles based on 100 parts by mass of inorganic particles | 5 | 5 | 4 | 0.5 | 10 |
| Electrical storage device | Residual capacity ratio (%) | 83.1 | 84.0 | 80.5 | 85.1 | 88.1 |
|  | Resistance increase ratio (%) | 180 | 210 | 130 | 170 | 290 |

*[1]Polymer A
*[2]Polymer B

The meaning of the abbreviation or the name of each component shown in Tables 1 to 3 is shown below.

<Monomer that Produces Polymer A>
VDF: vinylidene fluoride
HFP: hexafluoropropylene
TFE: tetrafluoroethylene <Monomer that Produces Polymer B>
MMA: methyl methacrylate
EHA: 2-ethylhexyl acrylate
BMA: n-butyl methacrylate
BA: n-butyl acrylate
AA: acrylic acid
MAA: methacrylic acid
AN: acrylonitrile
BD: 1,3-butadiene
ST: styrene <Dispersion Medium>
GBL: gamma-butyrolactone
NMP: N-methyl-2-pyrrolidone <Polymer Alloy?>
Yes: polymer alloy
No: not polymer alloy <Inorganic Particles>
Titanium oxide: KR380 (manufactured by Titan Kogyo Ltd., rutile type, number average particle size: 0.38 micrometers) was used directly, or KR380 was ground using an agate mortar, and classified using a sieve to prepare titanium oxide having a number average particle size of 0.08 micrometers or 0.12 micrometers.

Aluminum oxide: AKP-3000 (manufactured by Sumitomo Chemical Co., Ltd., number average particle size: 0.74 micrometers) or AKP-50 (manufactured by Sumitomo Chemical Co., Ltd., number average particle size: 0.22 micrometers) was used.

Zirconium oxide: UEP Zirconium Oxide (manufactured by Daiichi Kigenso Kagaku Kogyo Co., Ltd., number average particle size: 0.67 micrometers) was used.

Silica: Seahostar (registered trademark) KE-S50 (manufactured by Nippon Shokubai Co., Ltd., number average particle size: 0.54 micrometers) or Seahostar (registered trademark) KE-S100 (manufactured by Nippon Shokubai Co., Ltd., number average particle size: 0.98 micrometers) was used.

Magnesium oxide: PUREMAG (registered trademark) FNM-G (manufactured by Tateho Chemical Industries Co., Ltd., number average particle size: 0.50 micrometers) was used.

In Tables 1 to 3, the sign "-" indicates that the corresponding component was not used, or the corresponding operation was not performed.

As is clear from Tables 1 to 3, the electrical storage devices (lithium-ion batteries) of Example 1 to 25 including the cathode provided with the protective film according to the invention exhibited excellent initial resistance, excellent residual capacity after the durability test, and an excellent resistance increase suppression capability. In Comparative Examples 1 and 2, an electrical storage device that exhibits excellent residual capacity and an excellent resistance increase suppression capability could not be obtained. When using the binders of Comparative Examples 3 to 6, the electrical storage device exhibited high initial resistance, and a high resistance increase ratio after the durability test.

Figure 4:
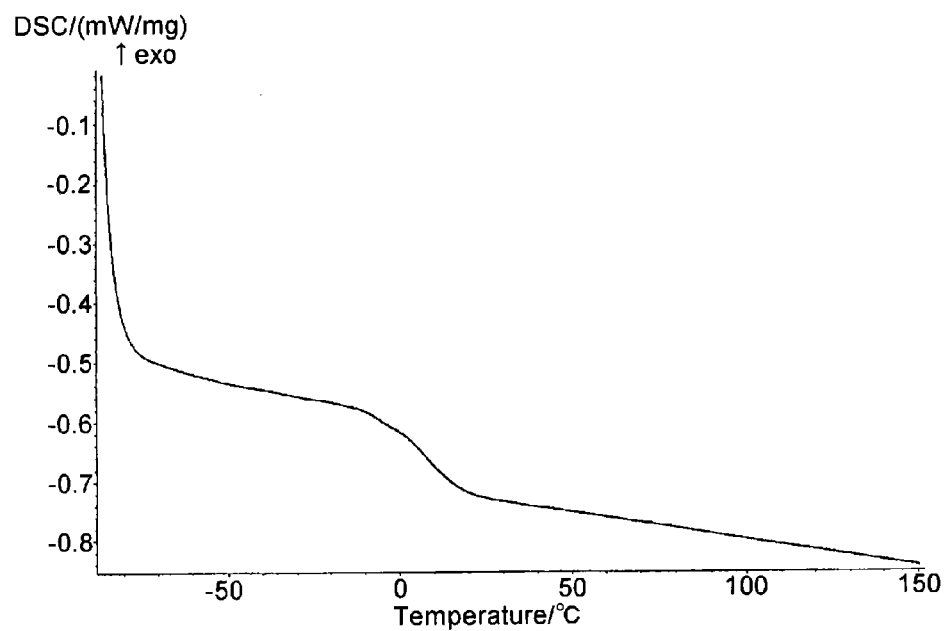
FIG. 4 shows the DSC chart of the polymer particles obtained in Example 3.
Figure 5:
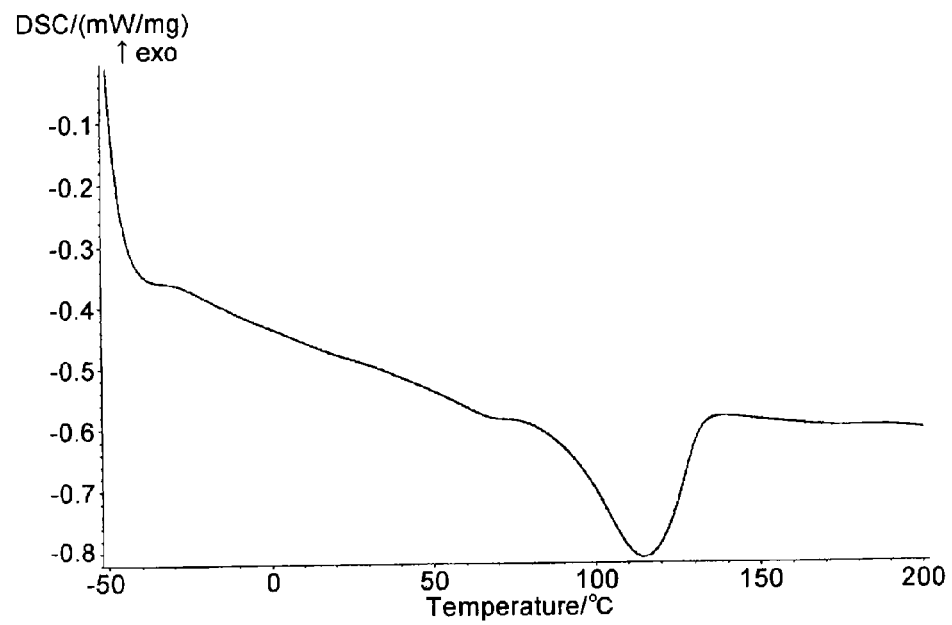
FIG. 5 shows the DSC chart of the polymer particles obtained in Comparative Example 1.
Figure 6:
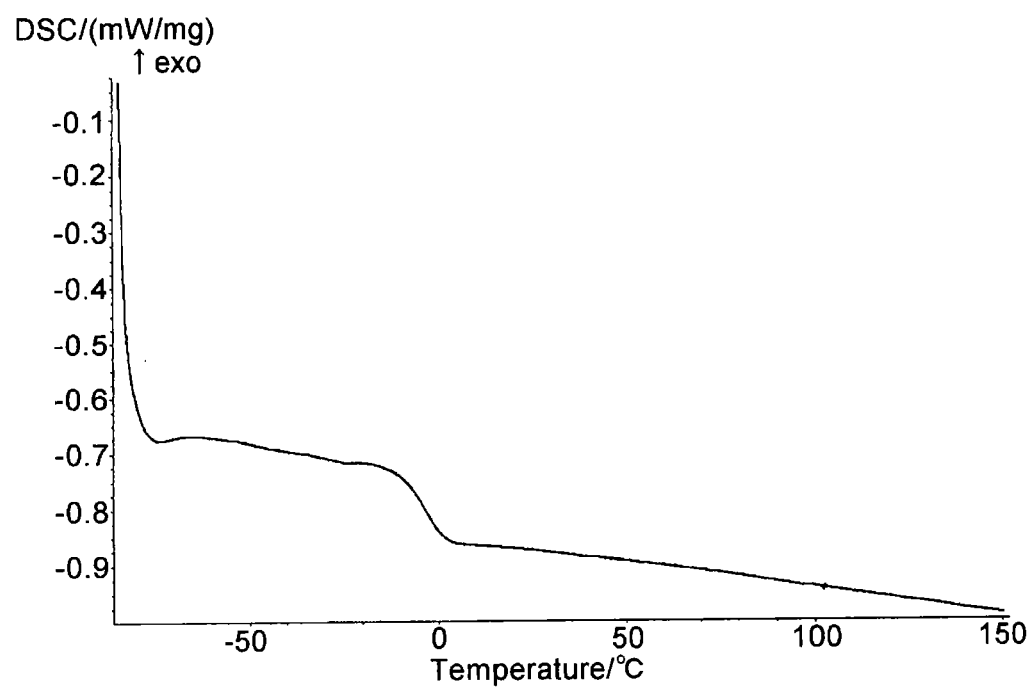
FIG. 6 shows the DSC chart of the polymer particles obtained in Comparative Example 2.

Whether or not the polymer particles were polymer alloy particles was determined based on the DSC chart. FIGS. 4 to 6 respectively show the DSC chart of the polymer particles obtained in Example 3, the DSC chart of the polymer particles obtained in Comparative Example 1, and the DSC chart of the polymer particles obtained in Comparative Example 2. FIG. 5 shows the case where the polymer particles included only the polymer A, FIG. 6 shows the case where the polymer particles included only the polymer B, and FIG. 4 shows the case where the polymer particles included the polymer A and the polymer B (i.e., polymer alloy particles). The melting temperature (Tm) of the polymer A is observed in FIG. 5, and the glass transition temperature (Tg) of the polymer B is observed in FIG. 6. In FIG. 4, the melting temperature (Tm) of the polymer A and the glass transition temperature (Tg) of the polymer B are not observed, and a single glass transition temperature (Tg) is observed at a temperature differing from the melting temperature (Tm) of the polymer A and the glass transition temperature (Tg) of the polymer B. Therefore, it is considered that the polymer particles were polymer alloy particles.

The invention is not limited to the above embodiments. Various modifications and variations may be made of the above embodiments. The invention includes various other configurations substantially the same as the configurations described in connection with the above embodiments (such as a configuration having the same function, method, and results, or a configuration having the same objective and results). The invention also includes configurations in which an unsubstantial part described in connection with the above embodiments is replaced with another part. The invention also includes a configuration having the same effects as those of the configurations described in connection with the above embodiments, or a configuration capable of achieving the same objective as that of the configurations described in connection with the above embodiments. The invention also includes a configuration in which a known technique is added to the configurations described in connection with the above embodiments.

REFERENCE SIGNS LIST 1, 2, 3: electrical storage device, 10, 110, 210: cathode, 12, 112, 212: cathode current collector, 14, 114, 214: cathode active material layer, 20, 120, 220: anode, 22, 122, 222: anode current collector, 24, 124, 224: anode active material layer, 30, 130, 230: protective film, 40, 140, 240: electrolyte solution, 150, 250: separator

The invention claimed is:

1. An electrical storage device comprising a cathode, an anode, a protective film that is present between the cathode and the anode, and an electrolyte solution,
   wherein the protective film comprises a polymer comprising from 15 to 60 parts by mass of a repeating unit derived from a fluorine-containing monomer, and a repeating unit derived from an unsaturated carboxylic acid monomer,
   wherein the fluorine-containing monomer is a fluorine-containing olefin monomer or a fluorine-containing (meth)acrylate monomer, and
   wherein the unsaturated carboxylic acid monomer is at least one member selected from the group consisting of a monocarboxylic acid and a dicarboxylic acid.

2. The electrical storage device according to claim 1, wherein the protective film is in contact with at least one surface selected from the group consisting of a surface of the cathode and a surface of the anode.

3. The electrical storage device according to claim 1, further comprising a separator that is present between the cathode and the anode.

4. The electrical storage device according to claim 3, wherein a surface of the separator is covered with the protective film.

5. The electrical storage device according to claim 3, wherein the protective film is held between the cathode or the anode, and the separator in a contact state.

6. The electrical storage device according to claim 1, wherein the protective film comprises a polymer comprising:
   from 15 to 40 parts by mass of a repeating unit derived from the fluorine-containing monomer,
   from 1 to 10 parts by mass of a repeating unit derived from the unsaturated carboxylic acid monomer, and
   from 30 to 84 parts by mass of a repeating unit derived from an unsaturated (meth)acrylate,
   based on 100 parts by mass of the repeating units of the polymer.

7. An electrical storage device comprising a cathode, an anode, a protective film that is disposed between the cathode and the anode, and an electrolyte solution,
   wherein the protective film comprises a polymer comprising
   from 15 to 60 parts by mass of repeating unit derived from the fluorine-containing monomer,
   from 1 to 10 parts by mass of repeating unit derived from the unsaturated carboxylic acid monomer,
   from 30 to 70 parts by mass of repeating unit derived from an unsaturated (meth)acrylate, and
   from 5 to 40 parts of mass of repeating unit derived from an alpha,beta-unsaturated nitrile compound selected from the group consisting of acrylonitrile, methacrylonitrile, alpha-chloroacylonitrile, alpha-ehtylacrylonitrile, vinylidene cyanide, and a combination thereof, based on 100 parts by mass of the polymer.

8. The electrical storage device according to claim 7, further comprising a separator that is present between the cathode and the anode.

9. The electrical storage device according to claim 8, wherein the protective film is present on the in contact with a surface of the separator.

10. The electrical storage device according claim 1, wherein the protective film comprises:
    the polymer, said polymer in the form of a distribution of polymer particles having a number average particle size of 20 nm to 450 nm; and
    inorganic particles selected from the group consisting of silica particles, titanium oxide particles, aluminum oxide particles, zirconium oxide particles, magnesium oxide particles and a mixture thereof each having a number average particle size of 0.1 microns to 0.8 microns, and
    wherein the protective film is the form of a dried film.

* * * * *

UNITED STATES PATENT AND TRADEMARK OFFICE
CERTIFICATE OF CORRECTION

PATENT NO. : 9,522,995 B2  
APPLICATION NO. : 14/352549  
DATED : December 20, 2016  
INVENTOR(S) : Yoshiharu Otsuka et al.

Page 1 of 1

It is certified that error appears in the above-identified patent and that said Letters Patent is hereby corrected as shown below:

In the Claims

Column 36, Line 14, "from 5 to 40 parts of mass of repeating unit derived from" should read --from 5 to 40 parts by mass of repeating unit derived from--

Column 36, Line 24, "wherein the protective film is present on the in contact with" should read --wherein the protective film is present on and in contact with--

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*